US012802357B2

(12) United States Patent
Wakui

(10) Patent No.: US 12,802,357 B2
(45) Date of Patent: Nov. 17, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Miki Wakui, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 227 days.

(21) Appl. No.: 18/740,559

(22) Filed: Jun. 12, 2024

(65) Prior Publication Data

US 2024/0428519 A1 Dec. 26, 2024

(30) Foreign Application Priority Data

Jun. 22, 2023 (JP) ................................ 2023-102776
Sep. 25, 2023 (JP) ................................ 2023-161507

(51) Int. Cl.
*G06T 17/20* (2006.01)
*G06T 7/11* (2017.01)
*G06T 7/90* (2017.01)
*H04N 13/279* (2018.01)

(52) U.S. Cl.
CPC ................ *G06T 17/20* (2013.01); *G06T 7/11* (2017.01); *G06T 7/90* (2017.01); *H04N 13/279* (2018.05); *G06T 2207/10024* (2013.01)

(58) Field of Classification Search
None
See application file for complete search history.

(56) References Cited

U.S. PATENT DOCUMENTS

2019/0251734 A1* 8/2019 Li ........................ H04N 13/161
2023/0230278 A1 7/2023 Wakui
2024/0029288 A1 1/2024 Wakui
2024/0282051 A1* 8/2024 Roimela ................ G06V 10/82

FOREIGN PATENT DOCUMENTS

JP 2021-064334 A 4/2021

OTHER PUBLICATIONS

Kim et al., View-dependent Transmission of Three-dimensional Mesh Models Using Hierarchical Partitioning, Dec. 31, 2023, Visual Communications and Image Processing, 1928- 938 (Year: 2003).*

* cited by examiner

*Primary Examiner* — Robert J Craddock
(74) *Attorney, Agent, or Firm* — Carter, DeLuca & Farrell LLP

(57) ABSTRACT

Depending on the positional relationship between the element configuring a 3D model and the camera viewpoint, it is not possible to color the fragment generated by UV development, and as a result of that, a texture image of low image quality including color voids is obtained. In the UV development, the fragment is generated by setting camera parameters of the virtual camera.

9 Claims, 19 Drawing Sheets

IMAGE PROCESSING APPARATUS, IMAGE PROCESSING METHOD, AND STORAGE MEDIUM

BACKGROUND

Field

The present disclosure relates to a technique to generate a texture image used to determine the color of three-dimensional shape data of an object.

Description of the Related Art

In recent years, three-dimensional computer graphics has been developing. In the three-dimensional computer graphics, the shape of an object is represented by mesh data (generally also called "3D model") including a plurality of polygons. Then, the color and material appearance of the object are represented by pasting a texture image to the surface of each polygon configuring the 3D model. It is possible to generate the texture image by dividing the 3D model into a plurality of groups and appending color information to a UV map in which two-dimensional pieces (called "fragments") generated by performing UV development for each group are arranged. For example, Japanese Patent Laid-Open No. 2021-64334 has disclosed a method of performing UV development for each group by selecting one camera viewpoint for each polygon from among a plurality of camera viewpoints corresponding to the object.

In a case where a camera exists only in the vicinity in the in-plane direction of a polygon configuring a 3D model, the shape of the fragment generated by the UV development becomes a crushed shape like a straight line, and therefore, there is such a problem that it is not possible to append color information. Here, explanation is given by using a specific example. FIG. 1A schematically shows a camera viewpoint 1103 arranged at the position from which two polygons 1101 and 1102 configuring mesh data of the face of a person are captured. FIG. 1B is a diagram showing a positional relationship between these two polygons 1101 and 1102 and the camera viewpoint 1103. Here, while the line-of-sight direction of the camera viewpoint 1103 and the polygon 1101 are substantially in the vertical relationship, the line-of-sight direction of the camera viewpoint 1103 and the polygon 1102 are substantially in the parallel relationship. Here, in a case where a fragment 1106 is generated by projecting the polygon 1101 based on the camera viewpoint 1103, several pixel centers indicated by black circles 1108 are included inside thereof. Consequently, it is possible to append color information to the fragment 1106 by using the pixel value of each of these pixels in the captured image of the camera viewpoint 1103. In contrast to this, in a case where a fragment 1107 is generated by projecting the polygon 1102 based on the camera viewpoint 1103, the pixel center of any pixel in the captured image of the camera viewpoint 1103 is not included inside thereof. As a result of that, it is not possible to append color information to the fragment 1107. As described above, depending on the positional relationship between the element (in the above-described example, polygon) configuring the 3D model and the camera viewpoint, it is not possible to color the fragment generated by the UV development, and as a result, there is such a problem that a texture image of low image quality including color voids is obtained.

SUMMARY

The image processing apparatus according to the present disclosure is an image processing apparatus including: one or more memories storing instructions; and one or more processors executing the instructions to perform: obtaining three-dimensional shape data of an object captured in a plurality of captured images whose viewpoints are different; dividing elements configuring the three-dimensional shape data into a plurality of groups; associating each of the plurality of groups with viewpoint information representing a specific viewpoint; generating a two-dimensional map based on the plurality of groups and the viewpoint information representing the specific viewpoint, which is associated with each group; and generating a texture image representing a color of the object based on the two-dimensional map, wherein the specific viewpoint includes a virtual viewpoint different from the viewpoint of each of the plurality of captured images.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

First, the hardware configuration and the software configuration of an image processing apparatus according to the present embodiment are explained with reference to the drawings.

Hardware Configuration

Figure 1A:
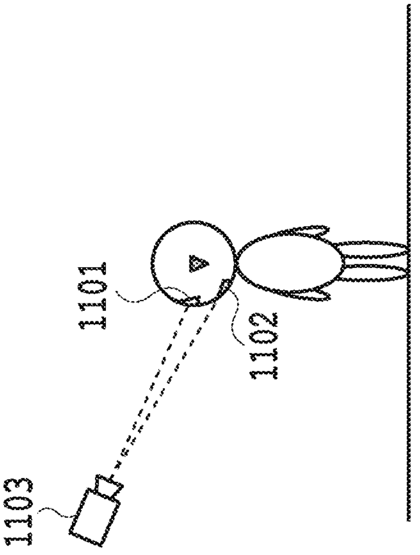
FIG. 1A is a diagram showing a camera viewpoint arranged at a position from which a polygon configuring mesh data is captured and FIG. 1B is a diagram showing a positional relationship between a polygon and a camera viewpoint.
Figure 1B:
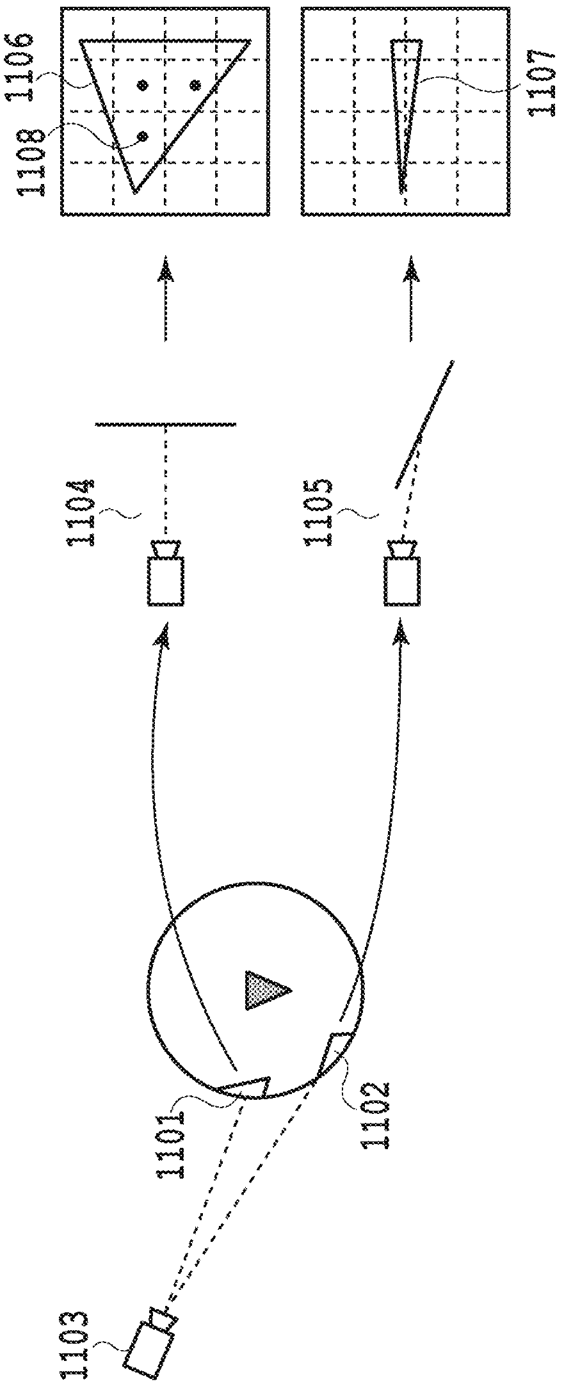
Figure 2A:
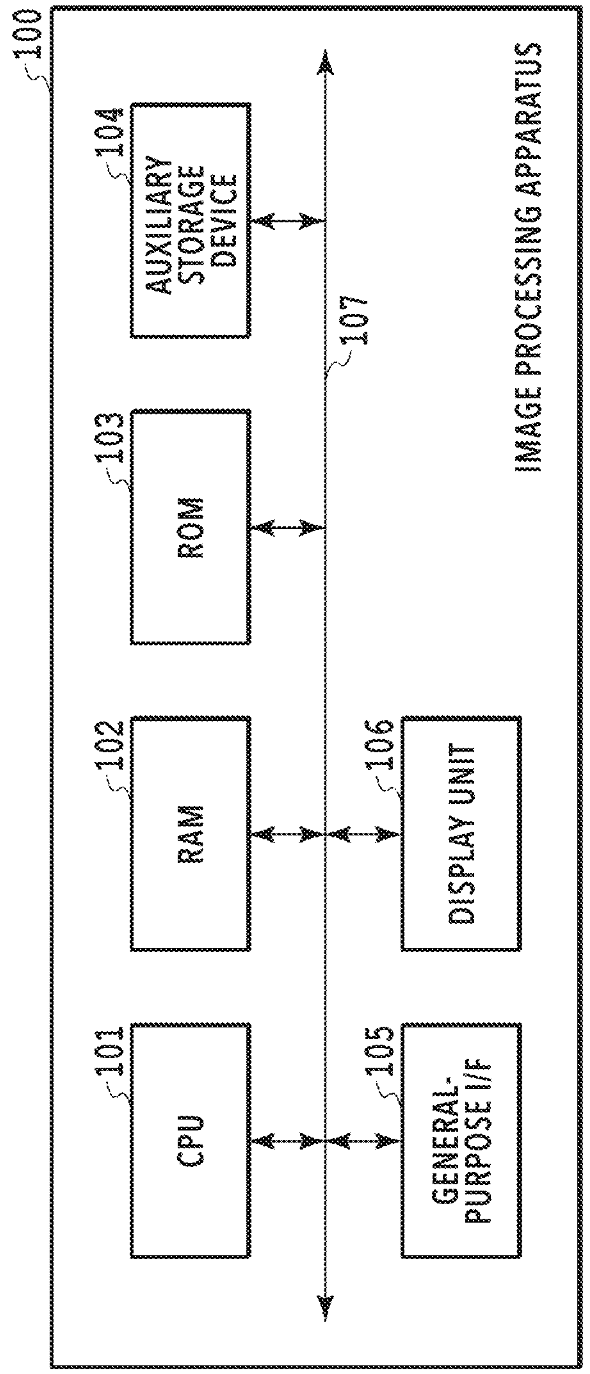
FIG. 2A is a block diagram showing one example of a hardware configuration comprised by an image processing apparatus and FIG. 2B is a block diagram showing one example of a software configuration of the image processing apparatus.

FIG. 2A is a block diagram showing one example of the hardware configuration comprised by an image processing apparatus 100 of the present embodiment. The image processing apparatus 100 has a CPU 101, a ROM 102, a RAM 103, an auxiliary storage device 104, a display unit 105, an operation unit 106, a communication unit 107, and a bus 108.

The CPU 101 is a central processing unit comprehensively controlling the image processing apparatus by executing programs stored in the ROM 102, the RAM 103 or the like. It may also be possible for the image processing apparatus 100 to further have one or a plurality of pieces of dedicated hardware different from the CPU 101 and at least part of the processing in the charge of the CPU 101 may be performed by the dedicated hardware in place of the CPU 101 or in cooperation with the CPU 101. As examples of the dedicated hardware, there are ASIC, FPGA, DSP (Digital Signal Processor) and the like. The ROM 102 is a memory storing programs and the like that do not need to be changed. The RAM 103 is a memory temporarily storing programs or data supplied from the auxiliary storage device 104, or data and the like supplied from the outside via the communication unit 107. The auxiliary storage device 104 includes, for example, a hard disk drive and stores various kinds of data, such as image data or voice data.

The display unit 105 includes, for example, a liquid crystal display, an LED or the like and displays a GUI (Graphical User Interface) or the like for a user to operate the image processing apparatus 100 or browse the state of the processing in the image processing apparatus 100. The operation unit 106 includes, for example, a keyboard, a mouse, a joystick, a touch panel or the like and receives operations by a user and inputs various instructions to the CPU 101. The CPU 101 also operates as a display control unit configured to control the display unit 105 and an operation control unit configured to control the operation unit 106.

The communication unit 107 performs communication, such as transmission and reception of data and the like, with an external device of the image processing apparatus 100. For example, in a case where the image processing apparatus 100 is connected with an external device by wire, a communication cable is connected to the communication unit 107. In a case where the image processing apparatus 100 has a function to wirelessly communicate with an external device, the communication unit 107 comprises an antenna. The bus 108 connects each unit comprised by the image processing apparatus 100 and transmits information. In the present embodiment, explanation is given on the assumption that the display unit 105 and the operation unit 106 exist inside of the image processing apparatus 100, but it may also be possible for at least one of the display unit 105 and the operation unit 106 to exist outside the image processing apparatus 100 as another device.

Software Configuration

Figure 2B:
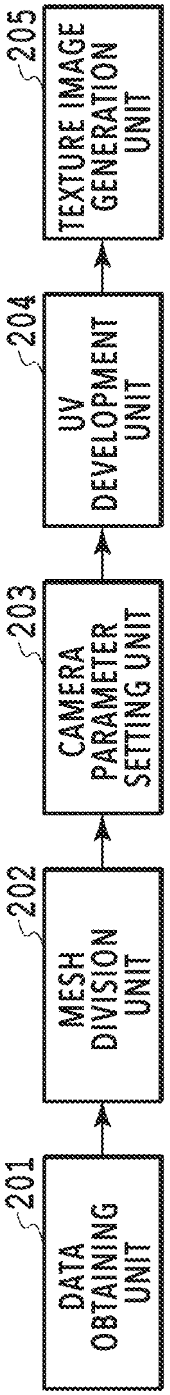

FIG. 2B is a block diagram showing one example of the software configuration (function configuration) of the image processing apparatus 100 of the present embodiment. The image processing apparatus 100 comprises a data obtaining unit 201, a mesh division unit 202, a camera parameter setting unit 203, a UV development unit 204, and a texture image generation unit 205. Each of these function units is implemented by the CPU 101 executing a predetermined program, or by dedicated hardware, such as ASIC and FPGA.

The data obtaining unit 201 obtains a 3D model (three-dimensional shape data) representing the three-dimensional shape of an object. As the data format of a 3D model, there is mesh data representing the surface shape of an object by a set of polygons, volume data representing the 3D shape of an object by voxels, point cloud data representing the 3D shape of an object by a set of points or the like. In the present embodiment, it is assumed that mesh data representing the surface shape of an object by a set of triangular polygons is obtained as a 3D model. The shape of a polygon is not limited to a triangle, and another polygon, such as a quadrilateral and a pentagon, may be used. Further, the data obtaining unit 201 obtains viewpoint information relating to the image capturing viewpoint of a plurality of imaging devices (in the following, called "real cameras") arranged in the image capturing space. This viewpoint information is generally called "camera parameter" and intrinsic parameters, such as the focal length and the image center, and extrinsic parameters representing the position, orientation and the like of the camera are included.

The mesh division unit 202 performs processing to put together elements (in the present embodiment, polygons configuring mesh data) configuring the obtained 3D model into a group corresponding to the image capturing viewpoint of a specific real camera.

The camera parameter setting unit 203 sets camera parameters corresponding to the imaging device having an appropriate camera viewpoint (image capturing viewpoint) to each group obtained by the mesh division unit 202. At this time, in a case where the real camera having an appropriate camera viewpoint does not exist among the plurality of arranged real cameras, camera parameters corresponding to a virtual imaging device (in the following, called "virtual camera") are set, which has an appropriate camera viewpoint but does not exist actually.

The UV development unit 204 develops mesh data, which is three-dimensional information, onto a two-dimensional plane and generates a UV map caused to correspond to the two-dimensional coordinates (horizontal coordinate U and vertical coordinate V). Specifically, first, the UV development unit 204 develops each polygon included in the divided group onto the two-dimensional plane and generates a two-dimensional piece (fragment) corresponding to the group. Then, the UV development unit 204 arranges the generated fragment of each group on the two-dimensional map (UV map) corresponding to mesh data.

A texture image generation unit 206 calculates the pixel value of each pixel configuring the UV map based on the plurality of captured images obtained by the plurality of real cameras and generates a texture image.

Operation Flow of Image Processing Apparatus

Figure 3:
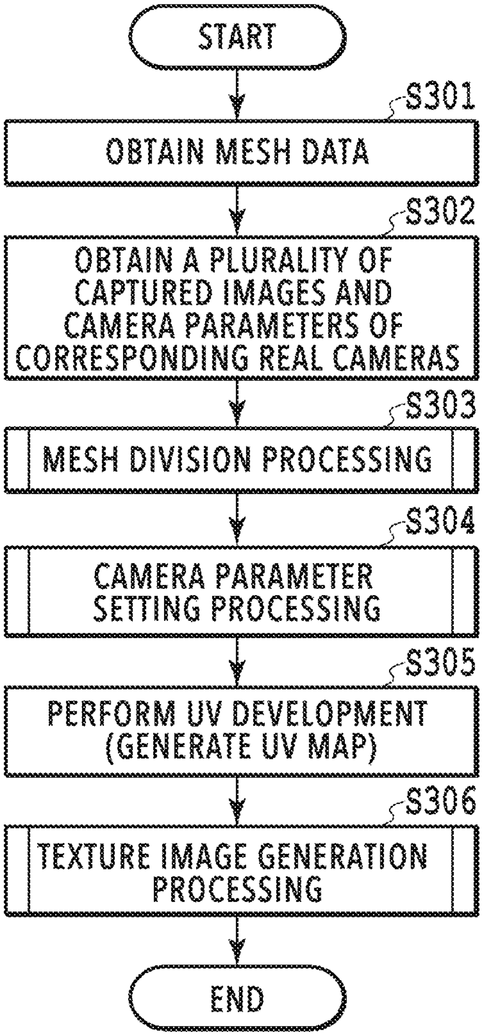
FIG. 3 is a flowchart showing a rough operation flow of the image processing apparatus according to a first embodiment.

Following the above, with reference to the flowcharts shown in FIG. 3 to FIG. 7, the operation of the image processing apparatus 100 according to the present embodiment is explained. FIG. 3 is the flowchart of a main routine indicating a rough operation flow of the image processing apparatus 100 and FIG. 4 to FIG. 7 are each the flowchart of a sub routine corresponding to specific processing within the main routine. In the following, along each flowchart, the operation flow of the image processing apparatus 100 is explained. In the following explanation, a symbol "S" means a step.

Figure 8A:
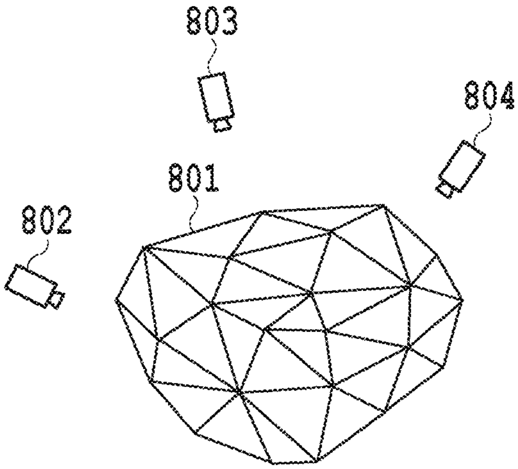
FIG. 8A is a diagram showing mesh data and real cameras corresponding to a plurality of captured images used to generate the mesh data.

At S301, the data obtaining unit 201 obtains mesh data of an object. Here, it is assumed that the data obtaining unit 201 obtains mesh data obtained by applying the marching cube method to the voxel data generated by applying the visual hull method. FIG. 8A shows obtained mesh data 801 and three real cameras 802, 803, and 804 corresponding to a plurality of captured images used for the generation of the mesh data 801. It may also be possible to obtain mesh data after generating voxel data within the image processing apparatus 100, or obtain mesh data by receiving mesh data generated by an external device, not shown schematically.

At S302, the data obtaining unit 201 obtains the above-described plurality of captured images and the camera parameters of the plurality of real cameras corresponding to each captured image.

Figure 8B:
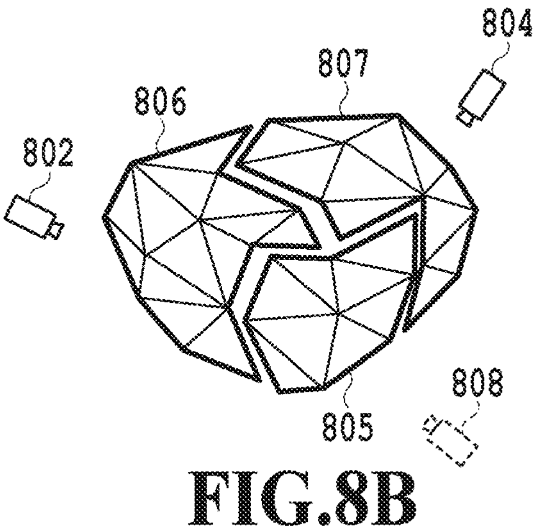
FIG. 8B is a diagram showing a state where the mesh data is divided into groups.

At S303, the mesh division unit 202 performs processing to divide the mesh data obtained at S301 based on the camera parameters of the real camera, which are obtained at S302. By this processing (in the following, called "mesh division processing"), the input mesh data is divided into a plurality of groups corresponding to each camera viewpoint. FIG. 8B shows the state where the mesh data 801 shown in FIG. 8A is divided into three groups 805, 806, and 807. In FIG. 8B, the area surrounded by a thick line indicates each group and it can be seen that each individual group includes a plurality of polygons. Details of the mesh division processing will be described later.

At S304, the camera parameter setting unit 203 sets the camera parameters of the camera having a camera viewpoint appropriate for the use in coloring processing, to be described later, to each group divided at S303. Here, in a case where the camera corresponding to "camera having an appropriate camera viewpoint" does not exist among the real cameras, a virtual camera not arranged actually is created. In the example in FIG. 8B, the real camera 802 is "camera corresponding to an appropriate camera viewpoint" for the group 806, the real camera 804 is that for the group 807, and a virtual camera 808 is that for the group 805. In this case, to the group 805, the camera parameters of the virtual camera 808 are set, to the group 806, the camera parameters of the real camera 802 are set, and to the group 807, the camera parameters of the real camera 804 are set. Details of the camera parameter setting processing will be described later.

Figure 8C:
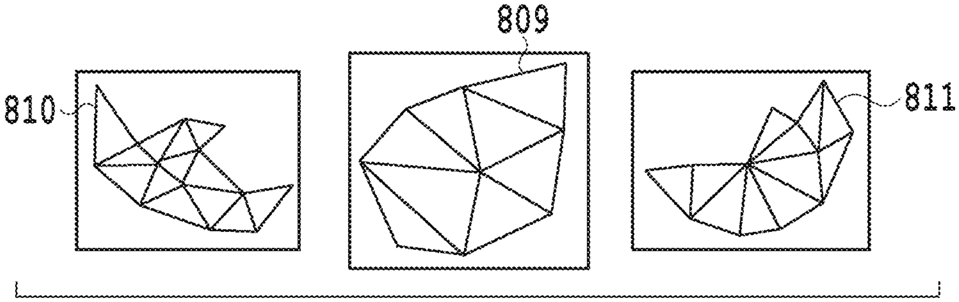
FIG. 8C is diagram showing each fragment corresponding to the group.
Figure 8D:
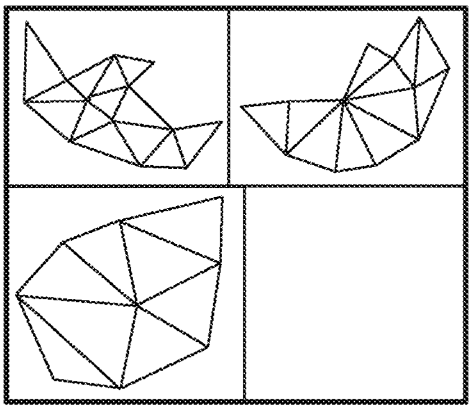
FIG. 8D is a diagram showing a state where the fragments are arranged on a two-dimensional map.

At S305, the UV development unit 204 performs UV development for each divided group. Specifically, the UV development unit 204 performs processing to generate a fragment by projecting each group based on the camera viewpoint represented by the camera parameters based on the camera parameters set for each group and arrange the fragment on the two-dimensional map. In this manner, the two-dimensional map (UV map) in which the fragment of each group is arranged and which corresponds to the mesh data is obtained. FIG. 8C shows fragments 809 to 811 corresponding to the three groups 805 to 807 shown in FIG. 8B and FIG. 8D shows the state where the fragments 809 to 811 are arranged on the two-dimensional map corresponding to the whole mesh data.

At S306, the texture image generation unit 205 generates a texture image by calculating the pixel value of each pixel included within the fragment using the captured image in which the group corresponding to the fragment is captured based on the two-dimensional map generated at S305. Details of the texture image generation processing will be described later.

The above is a rough operation flow in the image processing apparatus 100. It may also be possible to further perform processing to append color information to the surface of the polygon of the mesh data corresponding to each pixel of the texture image after the processing at S306.

Details of Mesh Division Processing

Figure 4:
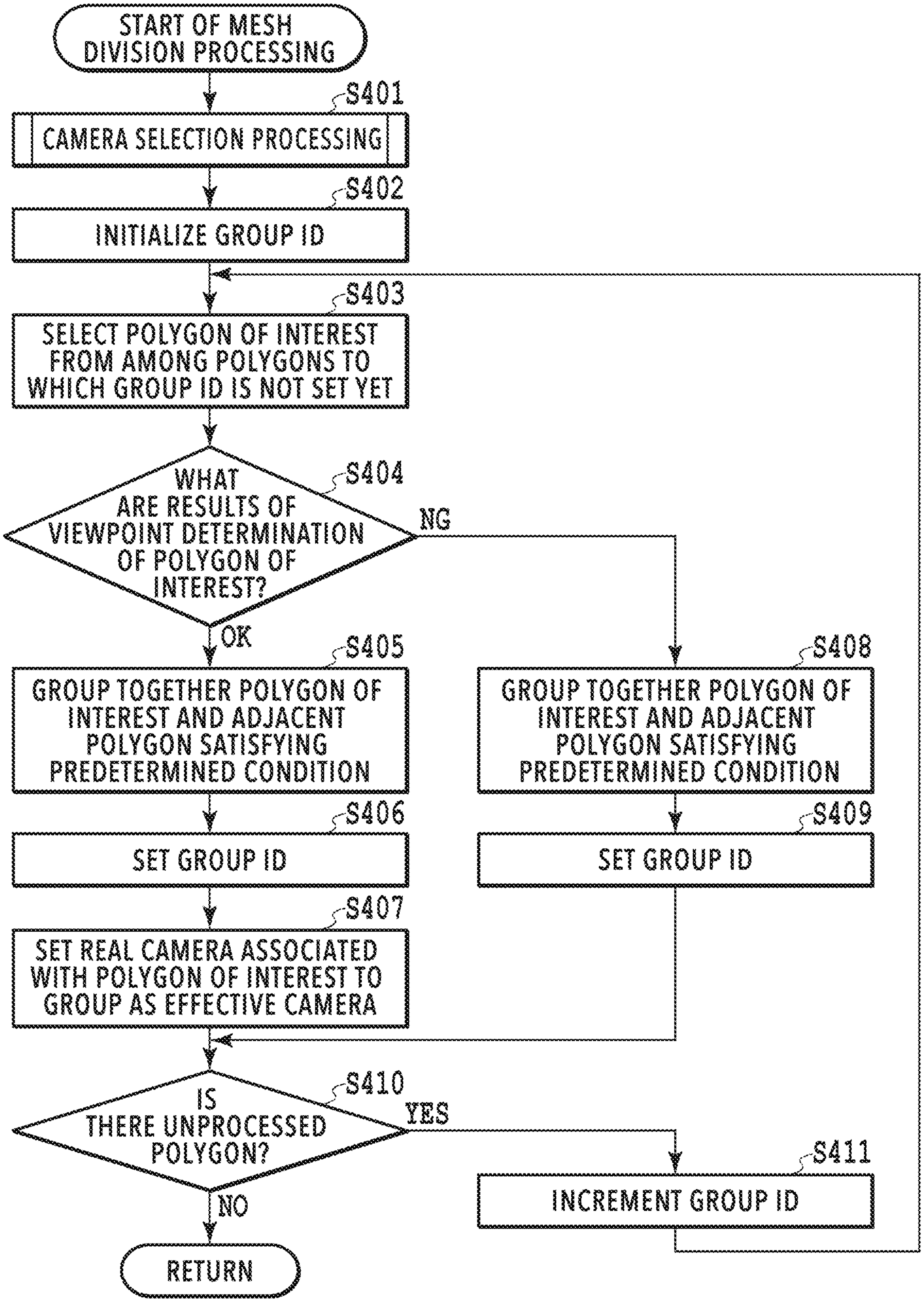
FIG. 4 is a flowchart showing details of mesh division processing according to the first embodiment.
Figure 5:
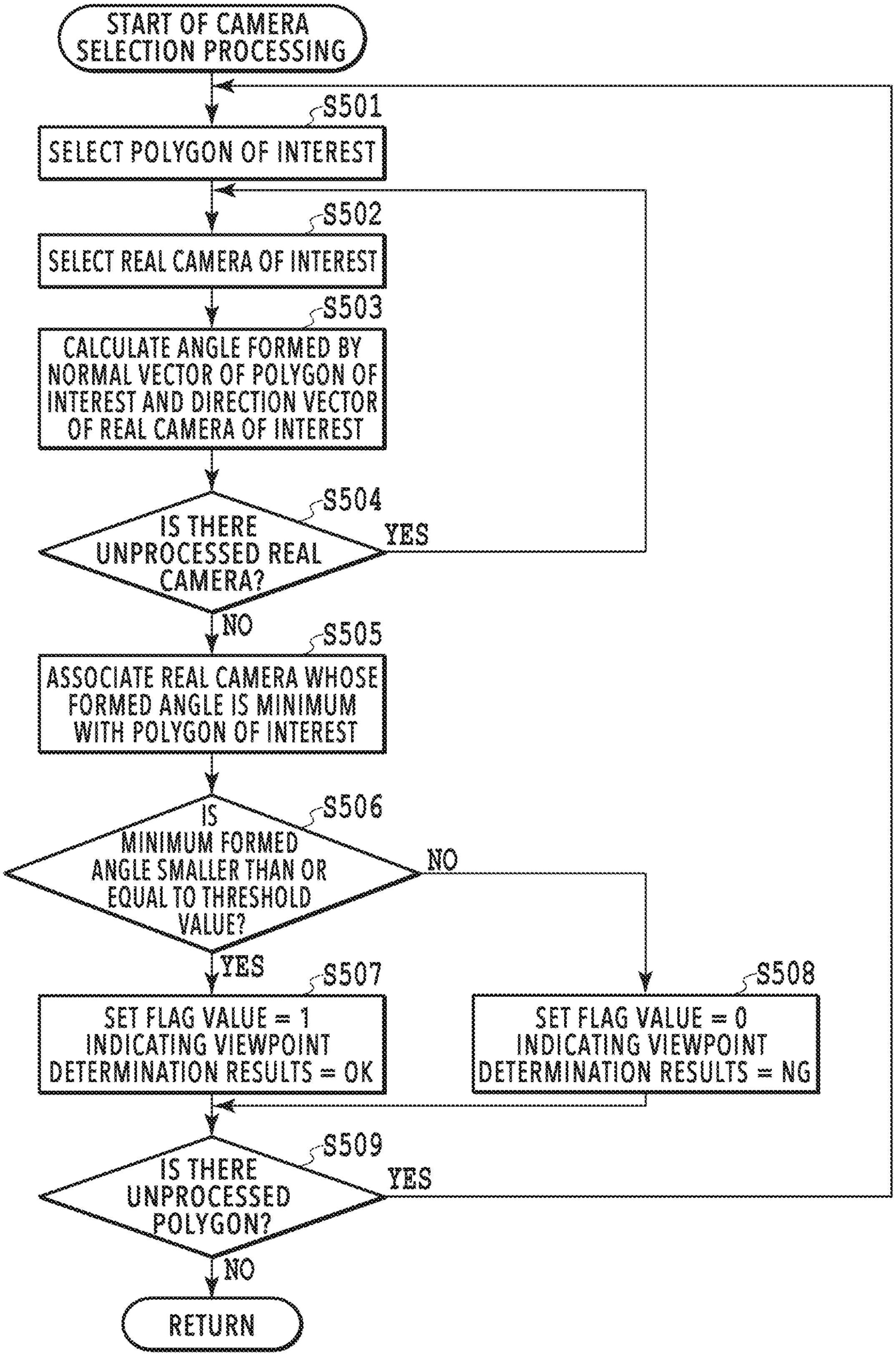
FIG. 5 is a flowchart showing details of camera selection processing.

Following the above, with reference to the flowchart in FIG. 4, the mesh division processing (S303) according to the present embodiment is explained in detail.

At S401, processing (camera selection processing) to select the real camera having captured the polygon in the best state (in the following, called "best camera") is performed for ach polygon, which is the element configuring the processing-target mesh data. Details of this camera selection processing will be described later. Determination of whether the image capturing viewpoint of the real camera selected for each polygon is appropriate as the camera viewpoint used in grouping to be described later is also performed and a correspondence table including the results of the viewpoint determination is created and stored. In the example in FIG. 8A described previously, the following correspondence table is created. In the following correspondence table, the reference symbol of each real camera in FIG. 8A is used as it is as the identifier (best camera ID) of the best camera.

TABLE 1

| Polygon ID | Best Camera ID | Viewpoint Determination Results (OK = 1, NG = 0) |
|---|---|---|
| 10 | 804 | 0 |
| 11 | 804 | 0 |
| 12 | 804 | 0 |
| 13 | 804 | 1 |
| 14 | 804 | 1 |
| 15 | 804 | 1 |
| 16 | 802 | 1 |
| 17 | 802 | 1 |
| 18 | 802 | 1 |
| 19 | 802 | 1 |
| . | . | . |

At S402, initialization (here, processing to set initial value=0) of the identifier (group ID) for managing a group to be generated from now on is performed.

At S403, one polygon not belonging to any group (not associated with any group ID) yet is selected as a polygon of interest from among each polygon configuring mesh data.

At S404, with reference to the results (here, the above-described correspondence table) of the camera selection processing at S401, the processing to be performed next is allocated in accordance with whether the viewpoint determination results of the real camera of the best camera ID associated with the polygon ID of the polygon of interest are "OK" or "NG". Here, in a case where the flag value of the polygon of interest is "1" representing OK, the processing at S405 is performed next and in a case where the flag value is "0" representing NG, the processing at S408 is performed next.

At S405, the adjacent polygon satisfying a predetermined condition with the polygon of interest is included in the same group as that of the polygon of interest. Specifically, first, the real camera associated as the best camera of the polygon of interest is identified. Then, from among the polygons with which the same real camera as the identified real camera is associated as the best camera, all the polygons whose viewpoint determination results are "OK" and which are adjacent to the polygon of interest are extracted. Then, a group including the polygon of interest and all the extracted adjacent polygons is created. Here, it is assumed that the condition of the adjacent polygon is that the polygons have one or more the same vertices in common.

At S406, to the polygon of interest belonging to the group created at S405 and the adjacent polygon thereof, a group TD identifying the group is set. Accompanying this, the column of the new group TD is added to the correspondence table described previously and the correspondence table is updated. In the example in FIG. 8A described previously, for example, the correspondence table is updated as follows.

TABLE 2

| Polygon ID | Best Camera ID | Viewpoint Determination Results (OK = 1, NG = 0) | Group ID |
|---|---|---|---|
| 10 | 804 | 0 | |
| 11 | 804 | 0 | |
| 12 | 804 | 0 | |
| 13 | 804 | 1 | 0 |
| 14 | 804 | 1 | 0 |
| 15 | 804 | 1 | 0 |
| 16 | 802 | 1 | 1 |
| 17 | 802 | 1 | 1 |
| 18 | 802 | 1 | 1 |
| 19 | 802 | 1 | 1 |
| . | . | . | . |

At S407, to the group to which the group TD is set at S406, the real camera associated as the best camera with the polygon of interest belonging to the group and the adjacent polygon thereof is set as the real camera (effective camera) having a viewpoint appropriate to the group. Accompanying this, the correspondence table described previously is updated, the column of "Effective Camera ID", which is the identifier of the effective camera, is added newly, and information identifying the real camera as the effective camera is input to the column. In the example in FIG. 8A described previously, the correspondence table is updated as follows. In the following correspondence table, the reference symbol of each real camera in FIG. 8A is used as it is as the effective camera ID.

TABLE 3

| Polygon ID | Best Camera ID | Effective Camera ID | Viewpoint Determination Results (OK = 1, NG = 0) | Group ID |
|---|---|---|---|---|
| 10 | 804 | — | — | |
| 11 | 804 | | | |
| 12 | 804 | | | |
| 13 | 804 | 804 | 1 | 0 |
| 14 | 804 | | | |
| 15 | 804 | | | |
| 16 | 802 | 802 | 1 | 1 |
| 17 | 802 | | | |
| 18 | 802 | | | |
| 19 | 802 | | | |
| . | . | . | . | . |

At S408, the adjacent polygon satisfying a predetermined condition with the polygon of interest is included in the same group as that of the polygon of interest. Specifically, first, the real camera associated as the best camera of the polygon of interest is identified. Then, from among the polygons with which the same real camera as the identified real camera is associated as the best camera, all the polygons whose viewpoint determination results are "NG" and which are adjacent to the polygon of interest are extracted. Then, a group including the polygon of interest and all the extracted adjacent polygons is created. Here, it is assumed that the condition of the adjacent polygon is, as at S405 described above, that the polygons have one or more the same vertices in common.

At S409, to the polygon of interest belonging to the group created at S408 and the adjacent polygon thereof, a group ID identifying the group is set. Accompanying this, the correspondence table described previously is updated and the column of the group ID is added newly. In the example in FIG. 8A described previously, for example, the correspondence table is updated as follows.

TABLE 4

| Polygon ID | Best Camera ID | Viewpoint Determination Results (OK = 1, NG = 0) | Group ID |
|---|---|---|---|
| 10 | 804 | 0 | 2 |
| 11 | 804 | 0 | 2 |
| 12 | 804 | 0 | 2 |
| 13 | 804 | 1 | 0 |
| 14 | 804 | 1 | 0 |
| 15 | 804 | 1 | 0 |
| 16 | 802 | 1 | 1 |
| 17 | 802 | 1 | 1 |
| 18 | 802 | 1 | 1 |
| 19 | 802 | 1 | 1 |
| . | . | . | . |

At S410, whether or not the processing described previously is completed by taking all the polygons configuring the mesh data as a target is determined. In a case where the processing is completed by taking all the polygons as a target, the above-described correspondence table at the point in time of the completion is stored in the RAM 102 as the results of the mesh division processing, and then, this flow is exited. On the other hand, in a case where there is an unprocessed polygon, the number of the group ID is incremented (+1) at S411, and the processing is returned to S403 and the same processing is repeated.

The above is the contents of the mesh division processing (S303). Following the above, with reference to the flowchart in FIG. 5, the camera selection processing (S401) according to the present embodiment is explained in detail.

Details of Camera Selection Processing

At S501, from among the polygons configuring the mesh data, one polygon of interest is selected. At next S502, from among the plurality of arranged real cameras, one real camera of interest is selected.

At S503, the angle formed by a normal vector of the polygon of interest selected at S501 and a direction vector of the real cameral of interest selected at S502 is calculated. Here, it is possible to find a normal vector nv of a triangular polygon by the cross product of edge vectors ($v_1$, $v_2$) based on its vertices ($p_0$, $p_1$, $p_2$) and the normal vector nv is expressed by formula (1) below.

$$nv = v_1 \times v_2 \quad \text{formula (1)}$$

In formula (1) described above, the edge vectors $v_1$ and $v_2$ are expressed by formula (2) and formula (3) below, respectively.

$$\vec{v_1} = (x_1, y_1, z_1) - (x_0, y_0, z_0) \quad \text{formula (2)}$$

$$\vec{v_2} = (x_2, y_2, z_2) - (x_0, y_0, z_0) \quad \text{formula (3)}$$

Further, in formulas (2) and (3) described above, $(x_0, y_0, z_0)=p_0$, $(x_1, y_1, z_1)=p_1$, and $(x_2, y_2, z_2)=p_2$.

Then, a direction vector cv of the real camera is found from position coordinates $p_{cam}$ of the real camera and a center of gravity $p_{tri}$ of the polygon and expressed by formula (4) below.

$$\vec{cv} = (x_{cam}, y_{cam}, z_{cam}) - (x_{tri}, y_{tri}, z_{tri}) \quad \text{formula (4)}$$

In formula (4) described above, $(x_{cam}, y_{cam}, z_{cam})=p_{cam}$ and $(x_{tri}, y_{tri}, z_{tri})=p_{tri}$. Further, $(x_{tri}, y_{tri}, z_{tri})$ is expressed by formula (5) below.

$$(x_{tri}, y_{tri}, z_{tri}) = \left(\frac{x_0 + x_1 + x_2}{3}, \frac{y_0 + y_1 + y_2}{3}, \frac{z_0 + z_1 + z_2}{3}\right) \quad \text{formula (5)}$$

Then, a formed angle θ is obtained by the inner product of the normal vector nv of the polygon and the direction vector cv of the real camera expressed by formula (6) below $$\cos\theta = \vec{nv} \cdot \vec{cv} \quad \text{formula (6)}$$

At S504, whether or not the processing at S503 is completed by taking all the arranged real cameras as a target is determined. In a case where the calculation of the formed angle θ described above is completed by taking all the real cameras as a target, the processing at S505 is performed next. On the other hand, in a case where there is a real camera for which the calculation of the formed angle θ described above is not performed yet, the processing returns to S502 and the same processing is repeated.

At S505, among all the arranged real cameras, the real camera whose calculated "formed angle" is the minimum is associated as the best camera for the polygon of interest. Due to this, for example, as in the correspondence table described previously, Polygon ID of the polygon of interest and Best Camera ID indicating the real camera as the best camera are stored in association with each other.

At S506, the processing that is performed next is allocated in accordance with whether or not the angle of "formed angle" (minimum angle) determined to be the minimum at S505 is smaller than or equal to a threshold value set in advance. The threshold value at this time is set in advance based on a rule of thumb and for example, it is preferable for the threshold value to be around 70 degrees. In a case where the minimum formed angle is smaller than or equal to the threshold value, the processing at S507 is performed next and in a case where the minimum formed angle is larger than the threshold value, the processing at S508 is performed next.

At S507, information indicating that the viewpoint of the real camera determined to be the bast camera for the polygon of interest is an appropriate camera viewpoint is set to the polygon of interest. Specifically, in the correspondence table described previously, to the column of "Viewpoint Determination Results" in the record of Polygon ID of the polygon of interest, a flag value of "1" indicating that the viewpoint is an appropriate camera viewpoint is set.

At S508, information indicating that the viewpoint of the real camera determined to be the best camera for the polygon of interest is not an appropriate camera viewpoint is set to the polygon of interest. Specifically, in the correspondence table described previously, to the record of Polygon ID of the polygon of interest, a flag value of "0" indicating that the viewpoint is not an appropriate camera viewpoint is set.

At S509, whether or not the processing described previously is completed by taking all the polygons configuring the mesh data as a target is determined. In a case where the processing is completed by taking all the polygons as a target, the above-described correspondence table at the point in time of the completion is stored in the RAM 102 as the results of the camera selection processing, and then, this flow is exited. On the other hand, in a case where there is an unprocessed polygon, the processing returns to S501 and the same processing is repeated.

The above is the contents of the camera selection processing (S401).

Details of Camera Parameter Setting Processing

Figure 6:
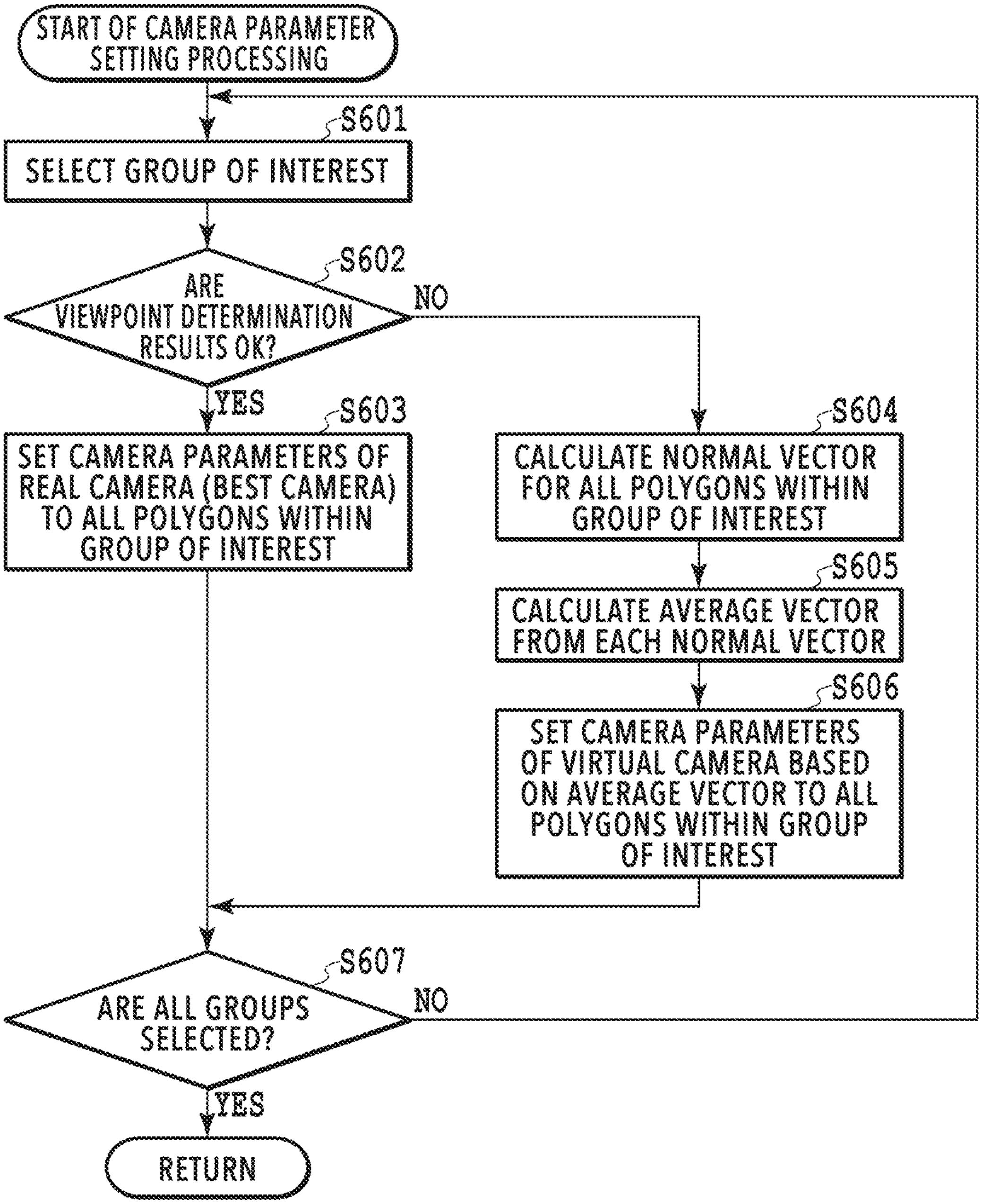
FIG. 6 is a flowchart showing details of camera parameter setting processing according to the first embodiment.

Following the above, with reference to the flowchart in FIG. 6, the camera parameter setting processing (S304) according to the present embodiment is explained in detail.

At S601, from among all the groups obtained by the mesh division processing (S303) described previously, one group of interest is selected.

At S602, with reference to the correspondence table described previously, based on the set value of the "Effective Camera ID" column of the selected group of interest, the processing that is performed next is allocated. Specifically, in a case where the camera ID of the real camera is set to the "Effective Camera ID" column in the record of the group of interest, the processing at S603 is performed next and in a case where nothing is set and the column is blank, the processing at S604 is performed next.

At S603, with reference to the correspondence table described previously, the camera parameters of the real camera identified by the camera ID described in the "Effective Camera ID" column are set to all the polygons belonging to the group of interest.

Figure 9:
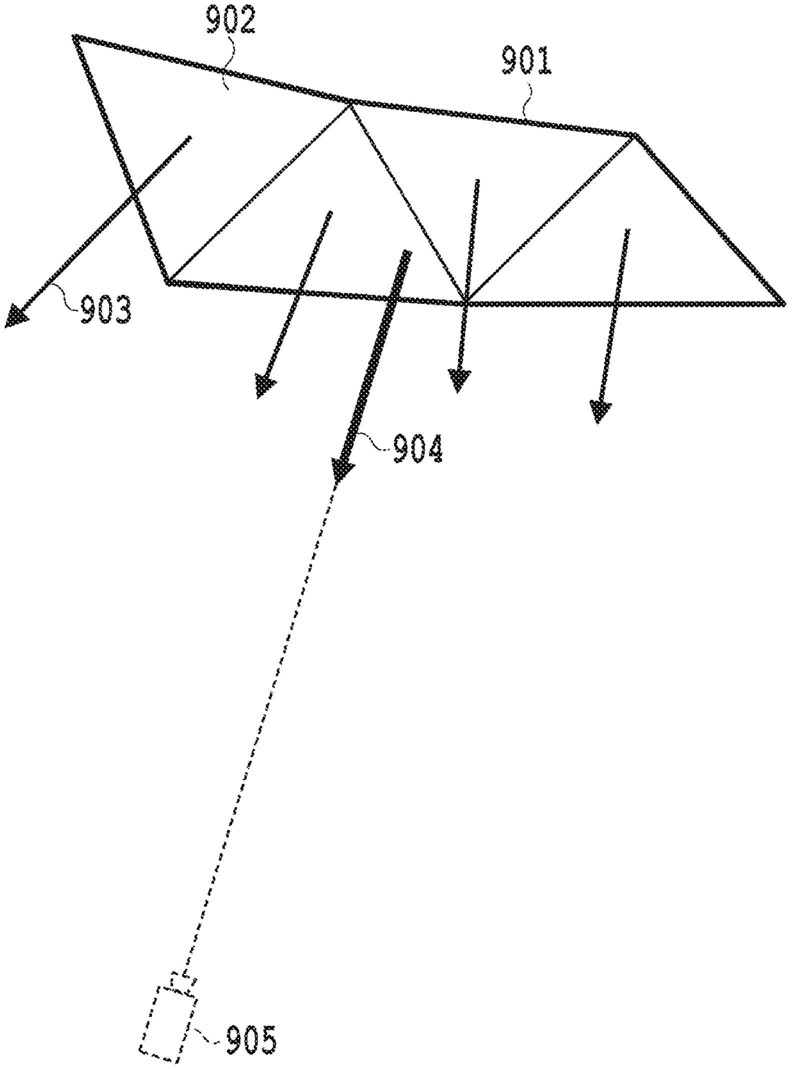
FIG. 9 is a diagram showing the way camera parameters of a virtual camera are set to a group.

At S604, for each polygon belonging to the group of interest, the calculation of the normal vector is performed. The normal vector calculation method is the same as that described at S503 described previously. At S605 that follows, the calculation of an average vector of the normal vectors calculated for all the polygons belonging to the group of interest is performed. Then, at S606, along the orientation of the average vector calculated at S605, the camera parameters corresponding to the virtual camera having a camera viewpoint whose line-of-sight direction is opposite are set. In this case, it is sufficient to adjust, and so on, the parameter values, such as the distance from the virtual camera to the object and the resolution of the virtual camera, to those of the peripheral real camera arranged actually. FIG. 9 is a diagram explaining the way the camera parameters of the-virtual camera are set to the group of interest. Here, a group of interest 901 includes four triangular polygons 902 and for each triangular polygon 902, a normal vector 903 indicated by a thin-line arrow is calculated, and based on these four normal vectors 903, an average vector 904 indicated by a thick-line arrow is calculated. In this case, the camera parameters corresponding to a virtual camera 905 having a camera viewpoint whose line-of-sight direction is opposite are set along the orientation of the average vector 904.

At S607, whether or not the processing described previously is completed by taking all the groups obtained by the mesh division processing as a target is determined. In a case where the processing is completed by taking all the groups as a target, this flow is exited. On the other hand, in a case where there is an unprocessed group, the processing returns to S601 and the same processing is repeated.

The above is the contents of the camera parameter setting processing (S304).

Details of Texture Image Generation Processing

Figure 7:
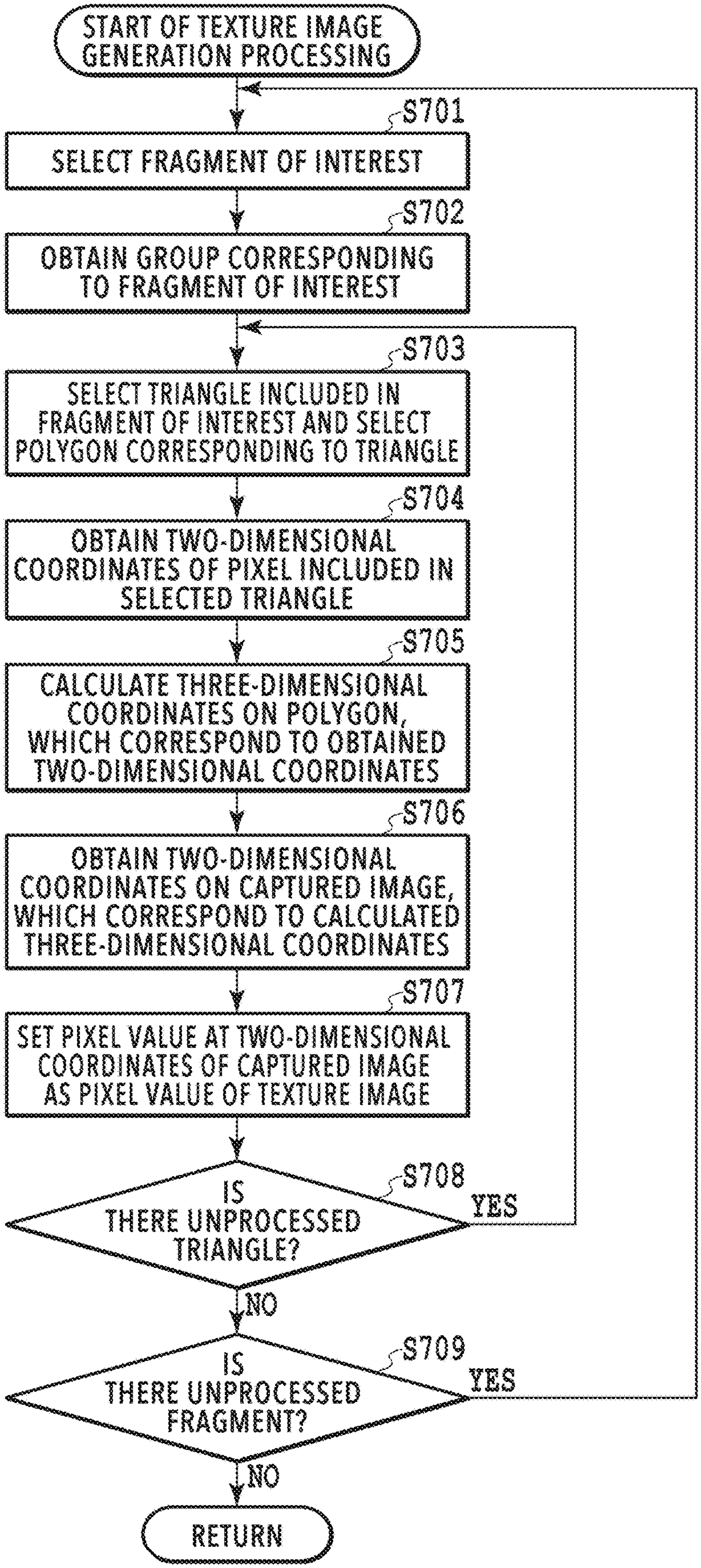
FIG. 7 is a flowchart showing details of texture image generation processing according to the first embodiment.

Following the above, with reference to the flowchart in FIG. 7, the texture image generation processing (S306) according to the present embodiment is explained in detail. At the point in time of the execution of this step, the correspondence table described previously has been updated as in Table 5 below by the preceding UV development (S305). That is, as the identifier (fragment ID) of the fragment generated for each group, the same set value as the corresponding group ID is stored.

TABLE 5

| Polygon ID | Best Camera ID | Viewpoint Determination Results (OK = 1, NG = 0) | Group ID | Fragment ID |
|---|---|---|---|---|
| 10 | 804 | 0 | 805 | 805 |
| 11 | | | | |
| 12 | | | | |
| 13 | 804 | 1 | 807 | 807 |
| 14 | | | | |
| 15 | | | | |
| 16 | 802 | 1 | 806 | 806 |
| 17 | | | | |
| 18 | | | | |
| 19 | | | | |
| . | . | . | . | . |

Figure 10:
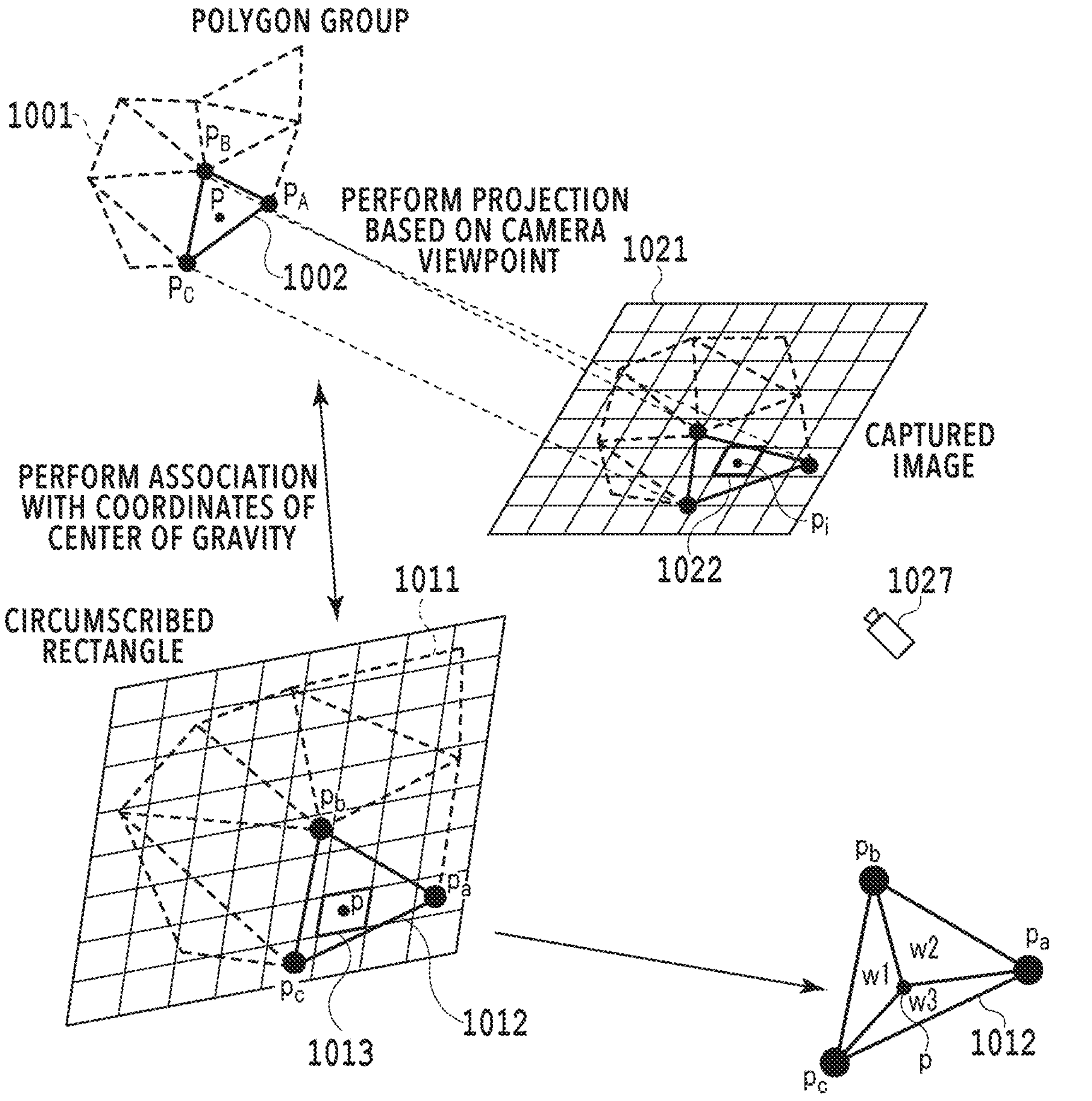
FIG. 10 is a diagram explaining a generation process of a texture image.

At S701, from among the fragments within the UV map, a fragment of interest is selected. FIG. 10 is a diagram explaining the generation process of a texture image and here, it is assumed that a fragment 1011 in the UV map is selected as the fragment of interest.

At S702, with reference to the correspondence table described previously, the group corresponding to the fragment of interest is obtained. In the example in FIG. 10 described above, as the group corresponding to the fragment 1011, a group 1001 is obtained.

At S703, from among the triangles included in the fragment of interest, a triangle of interest is selected first. Then, with reference to the correspondence table described previously, from among the polygon group corresponding to the group obtained at S702, the polygon corresponding to the triangle of interest is obtained. In the example in FIG. 10 described above, from among the plurality of triangles included in the fragment 1011, a triangle 1012 is selected as a triangle of interest and a polygon 1002 corresponding to the triangle 1012 is obtained from among the polygon group.

At S704, two-dimensional coordinates of a pixel on the UV map are obtained, which is located inside of the triangle of interest selected at S703. Here, in the example in FIG. 10 described above, two-dimensional coordinates (x, y) of a point p representing the pixel center of a pixel 1013 included inside of the triangle 1012 are obtained.

At S705, three-dimensional coordinates on the polygon obtained at S703 are calculated, which correspond to all the two-dimensional coordinates obtained at S704. In the example in FIG. 10 described above, three-dimensional coordinates (X, Y, Z) of a point P on the polygon 1002 corresponding to the two-dimensional coordinates (x, y) of the point p representing the pixel center of the obtained pixel 1013 are calculated. In this calculation, first, coordinates of the center of gravity of the pixel 1013 with three vertices pa, pb, and pc of the triangle 1012 as a reference are found. Then, by applying the found coordinates of the center of gravity of the pixel 103 to three vertices PA, PB, and PC of the polygon 1002, it is possible to obtain the three-dimensional coordinates (X, Y, Z) on the polygon 1002.

Details of Calculation Method

First, the coordinates of the center of gravity of the pixel 103 are calculated by using formula (7) below based on the area of three triangles formed by connecting the two-dimensional coordinates (x, y) of the point p representing the pixel center of the pixel 1013 and the three vertices pa, pb, and pc of the triangle 1012.

$$w_1 = Sp - p_b - p_c/(Sp_a - p_b - p_c) \qquad \text{formula (7)}$$

$$w_2 = Sp - p_a - p_b/(Sp_a - p_b - p_c)$$

$$w_3 = Sp - p_a - p_c/(Sp_a - p_b - p_c)$$

In formula (7) described above, $w_1$, $w_2$, and $w_3$ each represent the coordinates of the center of gravity and S represents the area of the triangle. Then, by using the calculated coordinates of the center of gravity, the two-dimensional coordinates of the point p in the triangle 1012 are calculated. Here, it is possible to express the two-dimensional coordinates of the point p in the triangle 1012 by formula (8) below.

$$p = w_1 p_a + w_2 p_b + w_3 p_c \quad \text{formula (8)}$$

Further, similarly, it is possible to express the three-dimensional coordinates of the point P in the polygon 1002 by formula (9) below.

$$P = w_1 P_A + w_2 P_B + w_3 P_C \quad \text{formula (9)}$$

As above, it is possible to obtain the three-dimensional coordinates on the polygon, which correspond to the two-dimensional coordinates of the inner pixel in the fragment on the UV map. Explanation is returned to the flowchart in FIG. 7.

At S706, with reference to the correspondence table described previously, the two-dimensional coordinates on the captured image are obtained, which correspond to the three-dimensional coordinates calculated at S705. In the example in FIG. 10 described above, a real camera 1027 is identified first, which is indicated by the best camera ID associated with the fragment ID of the fragment of interest. Then, the two-dimensional coordinates of a point pi are obtained, in a case where the three-dimensional coordinates of the point P on the polygon calculated at S705 are projected onto a captured image 1021 corresponding to the real camera 1027 based on the camera viewpoint of the real camera 1027.

At S707, the pixel value at the position indicated by the two-dimensional coordinates on the captured image obtained at S706 is set as the pixel value in the texture image corresponding to the point p on the UV map.

At S708, whether or not the above-described processing is completed for all the triangles included in the fragment of interest is determined. In a case where the processing is completed by taking all the triangles as a target, S709 is performed next. On the other hand, in a case where there is an unprocessed triangle, the processing returns to S703 and the same processing is repeated.

At S709, whether or not the above-described processing is completed by taking all the fragments generated by the UV development at S305 as a fragment of interest is determined. In a case where the processing is completed by taking all the fragments as a target, this flow is exited. On the other hand, in a case where there is an unprocessed fragment, the processing returns to S701 and the same processing is repeated.

The above is the contents of the texture image generation processing (S306).

Modification Example

In the above-described embodiment, as the condition in a case where the best camera in the camera selection processing (S401) is selected, the angle formed by the normal vector of the polygon of interest and the direction vector of the real camera of interest is used (S503), but this is not limited. For example, it may also be possible to use the area of a polygon obtained in a case where the polygon of interest is projected based on the image capturing viewpoint of the real camera of interest as the condition for selection. Specifically, three vertices of the polygon of interest are obtained and the three vertices are projected based on the camera parameters of the real camera of interest and two-dimensional coordinates p0, p1, and p2 are found. Then, from the two-dimensional coordinates p0, p1, and p2 thus found, edge vectors v1 and v2 are calculated and an area s of a triangle whose vertices are the two-dimensional coordinates p0, p1, and p2 is calculated. The area s in this case is expressed by formula (10) below.

$$\begin{aligned} p_0 &= (x_0, y_0) \quad \text{formula (10)} \\ p_1 &= (x_1, y_1) \\ p_2 &= (x_2, y_2) \\ \vec{v_1} &= (x_1, y_1) - (x_0, y_0) \\ \vec{v_2} &= (x_2, y_2) - (x_0, y_0) \\ s &= \frac{1}{2}\sqrt{|\vec{v_1}|^2|\vec{v_2}|^2 - (\vec{v_1}\cdot\vec{v_2})^2} \end{aligned}$$

As described above, it is sufficient to select the real camera having captured each polygon in the best state and associate the real camera whose calculated "area" is the maximum among all the arranged real cameras as the best camera for the polygon of interest at S505 that follows. Then, it is sufficient to set the flag value "1" indicating that the viewpoint is an appropriate camera viewpoint in a case where the "area" determined to be the maximum is larger than or equal to a threshold value set in advance, and set a flag value indicating that the viewpoint is not an appropriate camera viewpoint in a case where the "area" is smaller than the threshold value. It may be possible to set the threshold value in this case based on the resolution of each real camera, the number of pixels included in the triangle whose area is the maximum, and the like. Alternatively, it may also be possible to skip the threshold value processing because that the camera viewpoint is one at a predetermined level or higher is guaranteed at the point in time at which the calculation of the area succeeds.

As above, according to the present embodiment, by performing grouping of polygons in view of the positional relationship between each polygon configuring the mesh data and the real camera arranged in the image capturing space, the real camera or the virtual camera with an appropriate camera viewpoint is set for each group. Due to this, even in a case where the real camera exists only in the vicinity of the polygon in the in-plane direction, it is made possible to color the fragment generated by the UV development, and as a result of that, it is possible to obtain a texture image of high image quality.

Second Embodiment

In the first embodiment, whether the angle formed by the real camera direction and the normal vector of each polygon is smaller than or equal to the threshold value is determined and in a case where there is a polygon whose angle formed with any real camera is larger than or equal to the threshold value, the virtual camera is set. Next, an aspect is explained as a second embodiment in which mesh division processing is performed based on the orientation of the normal vector of each polygon of the mesh and UV development processing is performed by setting the virtual camera to all the groups.

<Operation Flow of Image Processing Apparatus>

Figure 11:
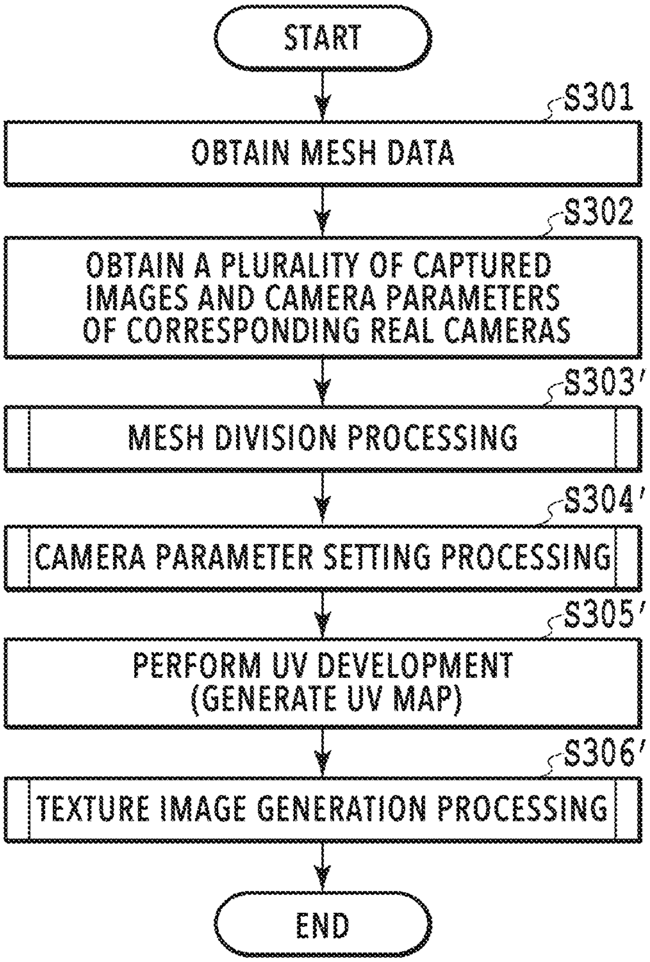
FIG. 11 is a flowchart showing a rough operation flow of an image processing apparatus according to a second embodiment.
Figure 12:
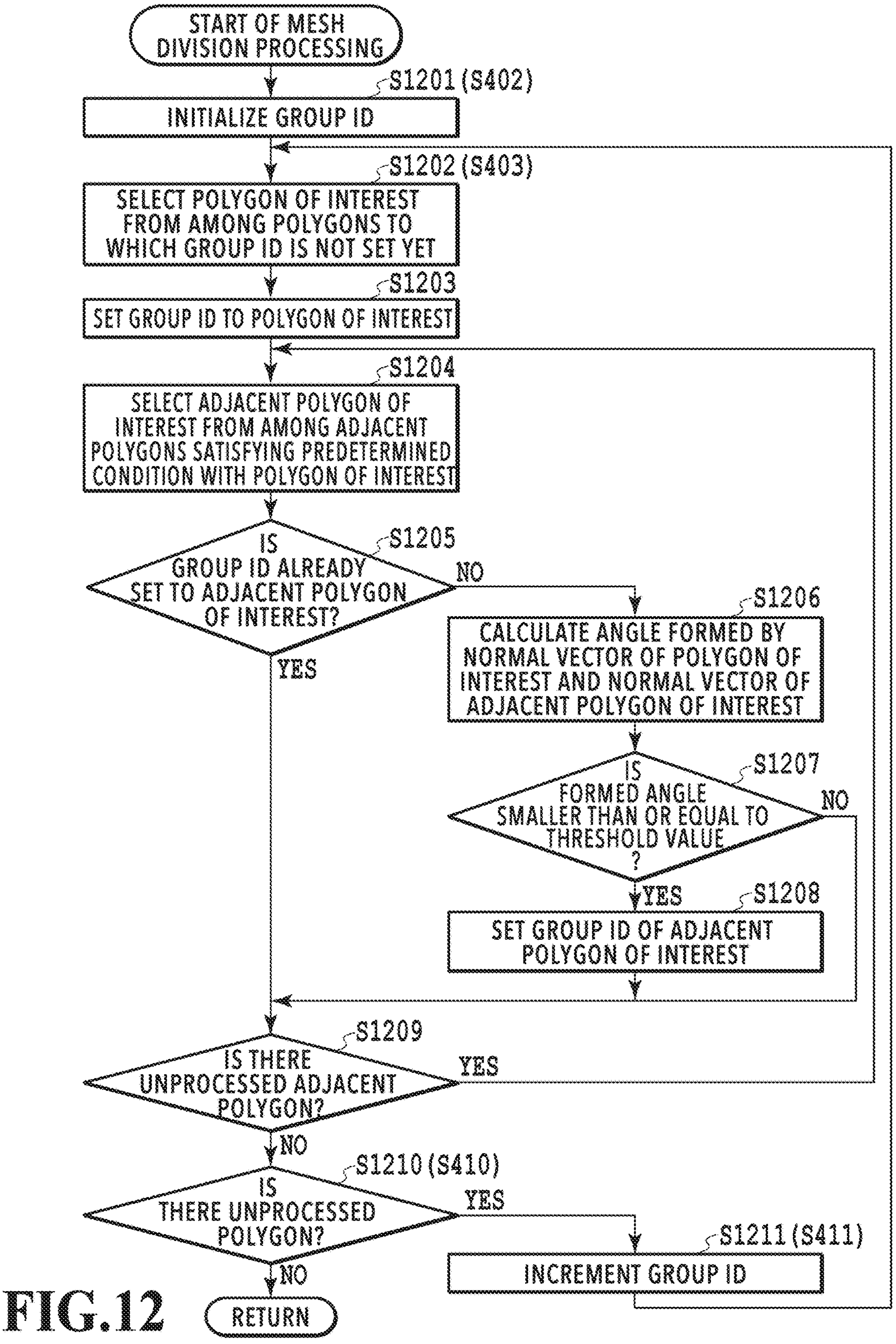
FIG. 12 is a flowchart showing details of mesh division processing according to the second embodiment.
Figure 13:
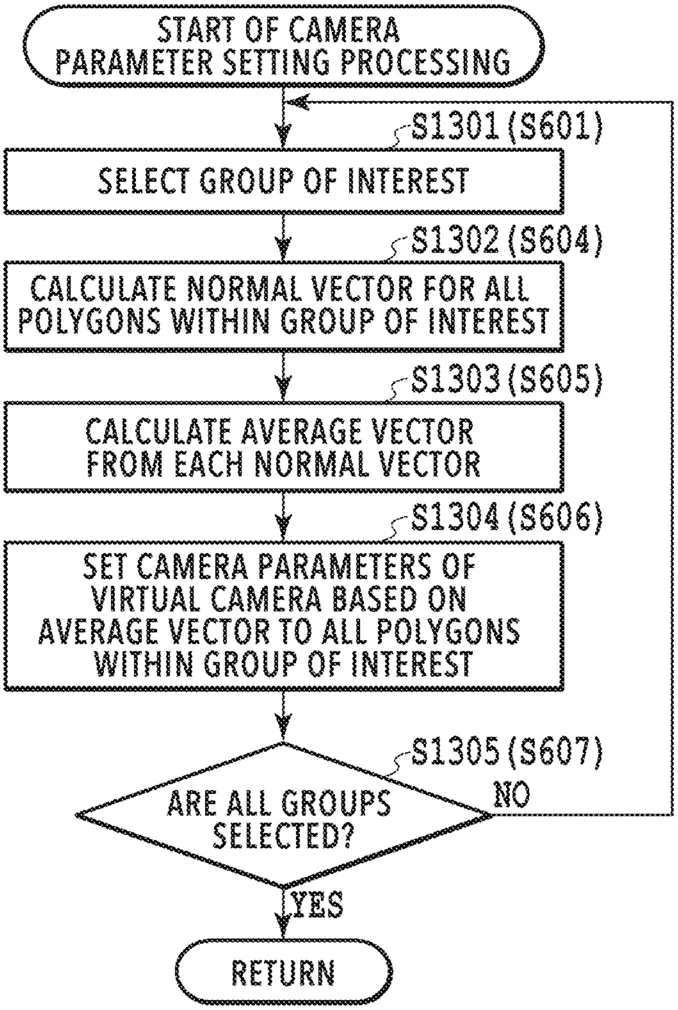
FIG. 13 is a flowchart showing details of camera parameter setting processing according to the second embodiment.
Figure 15:
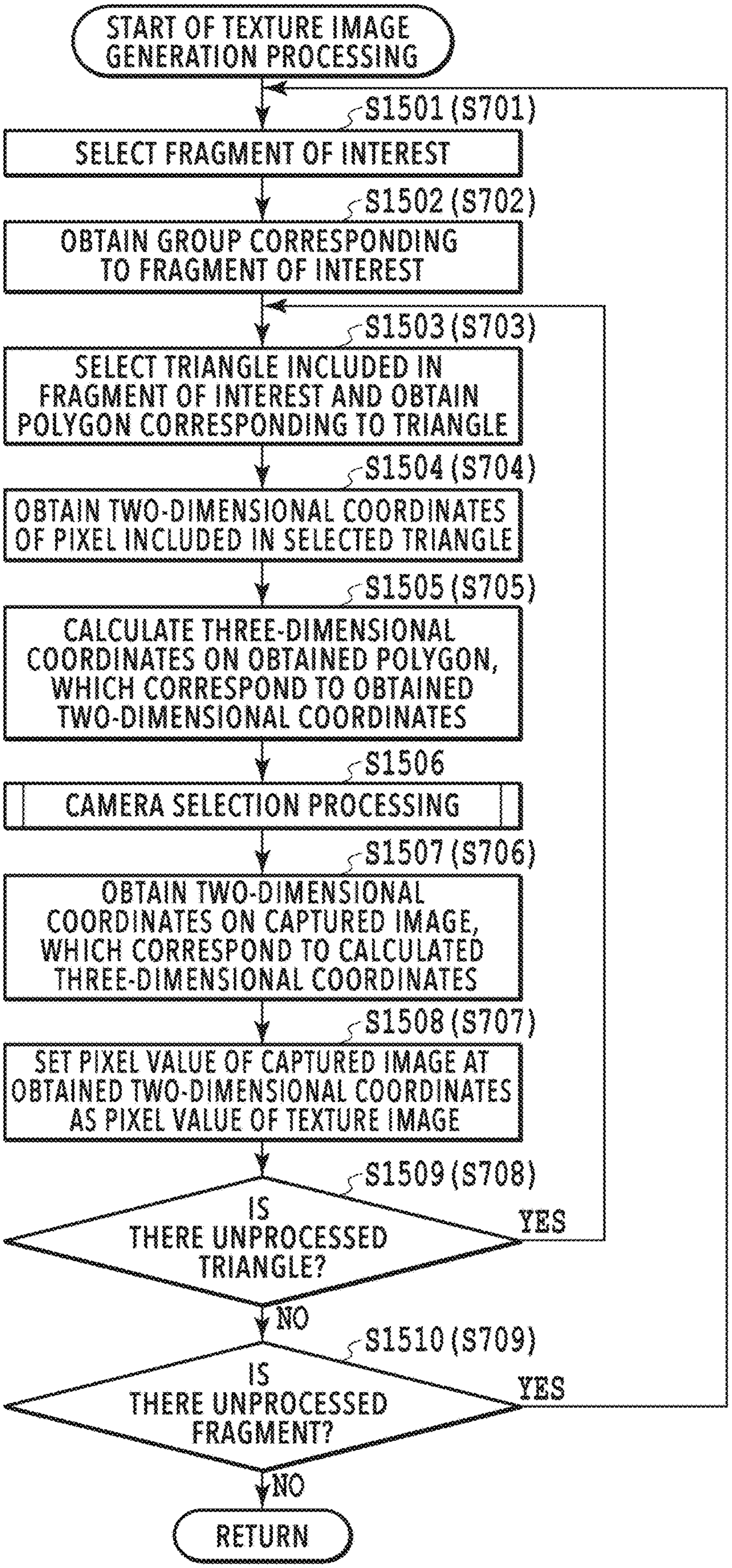
FIG. 15 is a flowchart showing details of texture image generation processing according to the second embodiment.

The operation of the image processing apparatus 100 according to the present embodiment is explained with reference to the flowcharts shown in FIG. 11 to FIG. 13 and FIG. 15. FIG. 11 is the flowchart of a main routine showing a rough operation flow of the image processing apparatus 100 and FIG. 12, FIG. 13, and FIG. 15 are each the flowchart of a sub routine corresponding to specific processing within the main routine. In the following, along each flowchart, the operation flow of the image processing apparatus 100 of the present embodiment is explained. In the following explanation, a symbol "S" means a step.

In the flowchart in FIG. 11, S301 and S302 are the same as those in the flowchart in FIG. 3 of the first embodiment, and therefore, explanation is omitted.

Figure 14A:
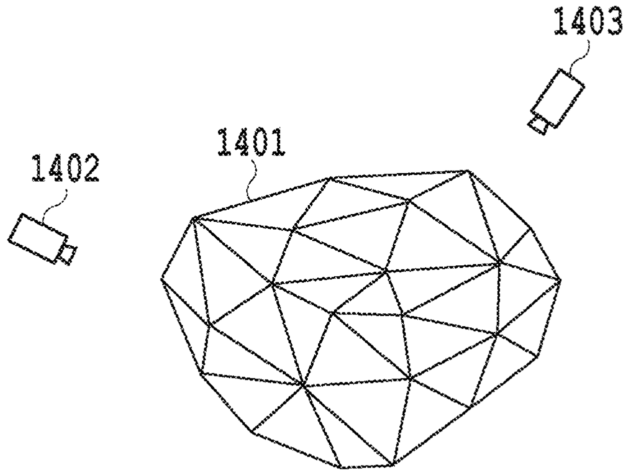
FIG. 14A is a diagram showing mesh data and FIG. 14B is a diagram showing a state where the mesh data is divided into groups.
Figure 14B:
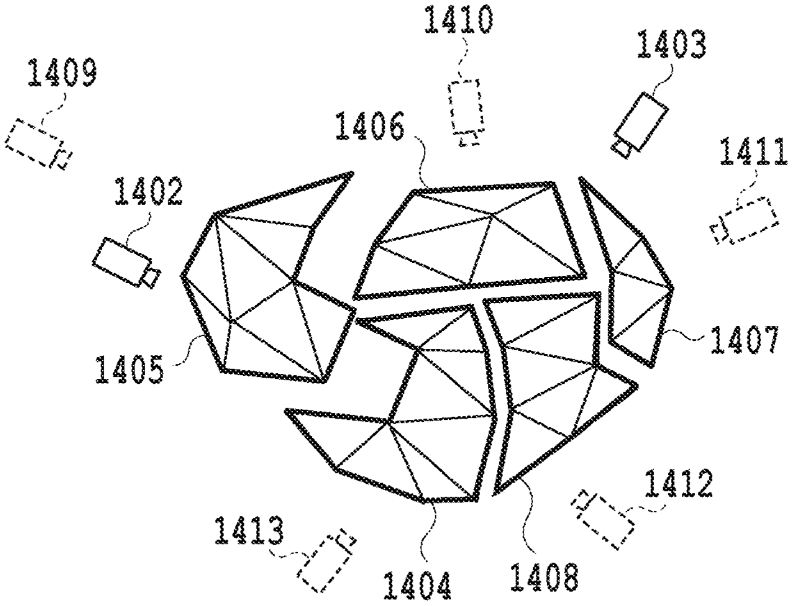

At S303' that follows S302, the mesh division unit 202 performs processing to divide the mesh data obtained at S301 into a plurality of groups. FIG. 14A shows obtained mash data 1401 and two real cameras 1402 and 1403 corresponding to a plurality of captured images used for the generation of the mesh data 1401. Then, FIG. 14B shows the state where the mesh data 1401 shown in FIG. 14A is divided into five groups 1404, 1405, 1406, 1407, and 1408. In FIG. 14B, the area surrounded by a thick line indicates each group and it can be seen that each individual group includes a plurality of polygons. Details of this mesh division processing will be described later.

At S304', the camera parameter setting unit 203 sets the camera parameters of the virtual camera that are used in the next UV development processing (S305') to each group divided at S303'. Details of this camera parameter setting processing will be described later.

At S305', the UV development unit 204 performs UV development for each divided group. In the present embodiment, processing is performed to generate a fragment by performing projection based on the camera viewpoint represented by the camera parameters and arrange the fragment on the two-dimensional map based on the camera parameters of the virtual camera set for each group at S304'. In this manner, the two-dimensional map (UV map) corresponding to mesh data is obtained, on which the fragment of each group is arranged.

At S306', the texture image generation unit 205 generates a texture image based on the camera parameters of the plurality of real cameras corresponding to each captured image obtained at S302 and the two-dimensional map generated at S305. Details of this texture image generation processing will be described later.

Details of Mesh Division Processing

Following the above, with reference to the flowchart in FIG. 12, the mesh division processing (S303') according to the present embodiment is explained in detail.

In the flowchart in FIG. 12, S1201 and S1202 correspond to S402 and S403, respectively, in the flowchart in FIG. 4 of the first embodiment. That is, initialization of the group ID for managing the group to be formed is performed (S1201) and following this, a polygon of interest is selected from among each polygon configuring the mesh data (S1202).

At S1203, a group ID is set to the polygon of interest.

At S1204, from among the adjacent polygons satisfying a predetermined condition with the polygon of interest, one adjacent polygon of interest is selected. It is assumed that the predetermined condition here is that the polygons have one or more the same sides in common.

At S1205, whether or not a group ID is already set to the adjacent polygon of interest is determined. In a case where it is determined that a group ID is set already, the processing moves to the processing at S1209. On the other hand, in a case where it is determined that no group ID is set, the processing moves to the processing at S1206.

At S1206, the angle formed by the normal vector of the polygon of interest and the normal vector of the adjacent polygon of interest is calculated. The calculation method of the angle formed between vectors is the same as that explained at S503 of the first embodiment.

At S1207, whether or not the angle of "formed angle" calculated at S1206 is smaller than or equal to the threshold value set in advance is determined. It is preferable for the threshold value in this case to be set in advance based on a rule of thumb as at S506 of the first embodiment and to be, for example, around 70 degrees. In a case where the angle is determined to be smaller than or equal to the threshold value, the processing moves to the processing at S1208. In a case where the angle is determined to be larger than the threshold value, the processing moves to the processing at S1209.

At S1208, the same group ID as the group ID set to the polygon of interest is set to the adjacent polygon of interest.

At S1209, whether or not the processing described previously is completed by taking all the adjacent polygons satisfying a predetermined condition with the polygon of interest as a target is determined. In a case where the processing is completed by taking all the adjacent polygons as a target, the processing moves to the processing at S1210. On the other hand, in a case where there is an unprocessed adjacent polygon, the processing returns to the processing at S1204, and the next adjacent polygon is selected and the processing is continued.

At S1210, as at S410 of the first embodiment. whether or not the processing described previously is completed by taking all the polygons configuring the mesh data as a target is determined. In a case where the processing is completed by taking all the polygons as a target, the results of the mesh division processing are stored in the RAM 102, and then, this flow is exited. On the other hand, in a case where there is an unprocessed polygon, at S1211, the number of the group ID is incremented (+1) as at S411 of the first embodiment, and the processing returns to S1202 and the same processing is repeated.

The above is the contents of the mesh division processing (S303'). By the above-described processing, the correspondence table as follows is created.

TABLE 6

| Polygon ID | Group ID |
|---|---|
| 10 | 0 |
| 11 | 0 |
| 12 | 0 |
| 13 | 0 |
| 14 | 1 |
| 15 | 1 |
| 16 | 1 |
| 17 | 2 |
| 18 | 2 |
| 19 | 2 |
| . | . |

Details of Camera Parameter Setting Processing

Following the above, with reference to the flowchart in FIG. 13, the camera parameter setting processing (S304')

according to the present embodiment is explained in detail. The difference from the camera parameter setting processing (see FIG. 6) in the first embodiment lies in that the viewpoint determination (S602) and the camera parameter setting of the real camera (S603) are removed. As shown in the flowchart in FIG. 13, S1301 corresponds to S601, S1302 to S604, S1303 to S605, S1304 to S606, and S1305 to S607, respectively. That is, for each group obtained by the mesh division processing (S303') described previously, the setting of a virtual camera is performed based on the normal vector of each polygon within the group. In this manner, in the example in FIG. 14B, for example, the correspondence table is updated as follow.

TABLE 7

| Polygon ID | Group ID | Virtual Camera ID |
|---|---|---|
| 10 | 0 | 1409 |
| 11 | | |
| 12 | | |
| 13 | | |
| 14 | 1 | 1410 |
| 15 | | |
| 16 | | |
| 17 | 2 | 1411 |
| 18 | | |
| 19 | | |
| . | . | . |

After the above-described camera parameter setting processing (S304') is completed, the processing moves to the UV development (S305') for each group.

At S305', based on the above-described correspondence table, processing is performed, which generates a fragment by performing projection based on the camera viewpoint represented by the camera parameters and arranges the fragment on the two-dimensional map based on the camera parameters of the virtual camera set for each group. Due to this, to the correspondence table created in the camera parameter setting processing, the column of Fragment ID is added and as the identifier (Fragment ID) of the fragment generated for each group, the same set value as the corresponding group ID is stored. In the example in FIG. 14B, the correspondence table in Table 7 is updated to Table 8 below.

TABLE 8

| Polygon ID | Group ID | Virtual Camera ID | Fragment ID |
|---|---|---|---|
| 10 | | | |
| 11 | 0 | 1409 | 1409 |
| 12 | | | |
| 13 | 1 | 1410 | 1410 |
| 14 | | | |
| 15 | | | |
| 16 | 2 | 1411 | 1411 |
| 17 | | | |
| 18 | | | |
| 19 | | | |
| . | . | . | . |

Details of Texture Image Generation Processing

Figure 16:
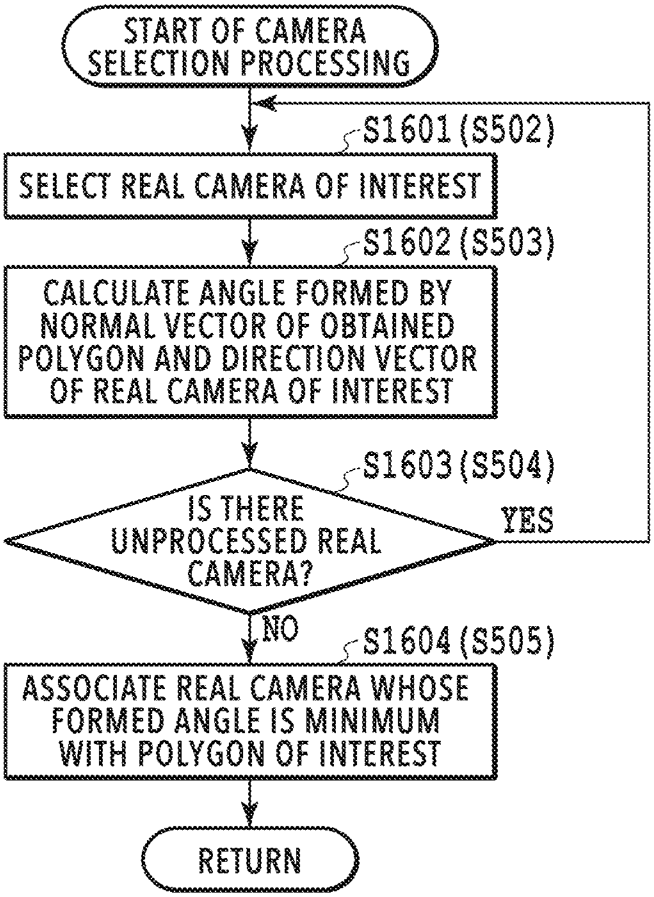
FIG. 16 is a flowchart showing details of camera selection processing.

Following the above, with reference to the flowchart in FIG. 15, the texture image generation processing (S306') according to the present embodiment is explained in detail. The difference from the texture image generation processing (see FIG. 7) in the first embodiment lies in that camera selection processing (S1506) is added between S705 and S706. As shown in the flowchart in FIG. 15, S1501 to S1505 correspond to S701 to S705, respectively, and S1507 to S1510 correspond to S706 to S709, respectively. In the present embodiment, in a case where the processing up to S1505 (that is, the processing up to S705 in the flowchart in FIG. 7) is completed, at S1506, processing to select the real camera having captured the polygon obtained at S1503 (S703) in the best state is performed at S1506. Details of the camera selection processing according to the present embodiment are explained with reference to the flowchart in FIG. 16.

Details of Camera Selection Processing

The difference from the camera selection processing (see FIG. 5) in the first embodiment lies in that the processing relating to the selection of a polygon (S501, S509) and the processing to set a flag value in accordance with the viewpoint determination results (S506 to S508) do not exist because they are not necessary. A specific flow of the processing is as follows.

At S1601 (S502), from among the plurality of arranged real cameras, one real camera of interest is selected.

At S1602 (S503), the angle formed by the normal vector of the polygon obtained at S703 and the direction vector of the real camera of interest selected at S1601 is calculated.

At S1603 (S504), whether or not the processing at S1602 is completed by taking all the arranged real cameras as a target is determined. In a case where the above-described calculation of the formed angle θ is completed by taking all the real cameras as a target, processing at S1604 is performed next. On the other hand, in a case where there is a real camera for which the above-described calculation of the formed angle θ is not performed yet, the processing returns to S1601 and the same processing is repeated.

At S1604 (S505), among all the arranged real cameras, the real camera whose calculated "formed angle" is the minimum is associated as the best camera for the polygon obtained at S703.

The above is the contents of the camera selection processing according to the present embodiment. Due to this, to the correspondence table created in the UV development described above (S305'), the column of Real Camera ID is added and the real camera ID corresponding to each Polygon ID is set. As a result of that, in the example in FIG. 14B, the correspondence table in Table 8 is updated to Table 9 as below.

TABLE 9

| Polygon ID | Group ID | Virtual Camera ID | Fragment ID | Real Camera ID |
|---|---|---|---|---|
| 10 | | | | 1402 |
| 11 | 0 | 1409 | 1409 | 1402 |
| 12 | | | | 1402 |
| 13 | 1 | 1410 | 1410 | 1402 |
| 14 | | | | 1403 |
| 15 | | | | 1403 |
| 16 | 2 | 1411 | 1411 | 1403 |
| 17 | | | | 1403 |
| 18 | | | | 1403 |
| 19 | | | | 1403 |
| . | . | . | . | . |

Explanation is returned to the texture image generation processing.

At S1507 (S706), with reference to the correspondence table updated as described above, the two-dimensional coordinates on the captured image are obtained, which correspond to the three-dimensional coordinates calculated at S1505. That is, the two-dimensional coordinates in a case where the three-dimensional coordinates calculated at S1505 (S705) are projected onto the captured image corresponding to the real camera based on the camera viewpoint of the real camera selected at S1506 are obtained. Explanation with the case in FIG. 10 described previously as an example is as follows. First, the fragment ID of the fragment of interest 1011 (selected at S1501) is obtained. Next, the polygon ID of the polygon 1002 corresponding to the triangle of interest 1012 included in the fragment of interest 1011 is obtained. Next, the real camera 1027 indicated by the real camera ID associated with the polygon ID is identified. Then, the two-dimensional coordinates of the point pi in a case where the three-dimensional coordinates of the point P on the polygon 1002 calculated at S1505 are projected onto the captured image 1021 corresponding to the real camera 1027 based on the camera viewpoint of the real camera 1027 are obtained.

At 51508, the pixel value on the captured image in the two-dimensional coordinates obtained at S1507 is set as the pixel value of the texture image.

The above is the contents of the texture image generation processing (S306') according to the present embodiment.

According to the present embodiment, first, grouping with the orientation of the normal vector of each polygon configuring the mesh data taken into consideration is performed and the virtual camera is set for each group. Due to this, it is made possible to perform UV development with the shape of the mesh data taken into consideration, and therefore, it is possible to generate a fragment of a higher accuracy.

Third Embodiment

In the second embodiment, the aspect is explained in which the mesh division processing is performed based on the orientation of the normal vector of each polygon of the mesh and the virtual camera is set to all the groups. Next, an aspect is explained as a third embodiment in which a plurality of virtual cameras is arranged at positions determined in advance and mesh division processing and UV development processing are performed based on each arranged virtual camera.

Operation Flow of Image Processing Apparatus

Figure 17:
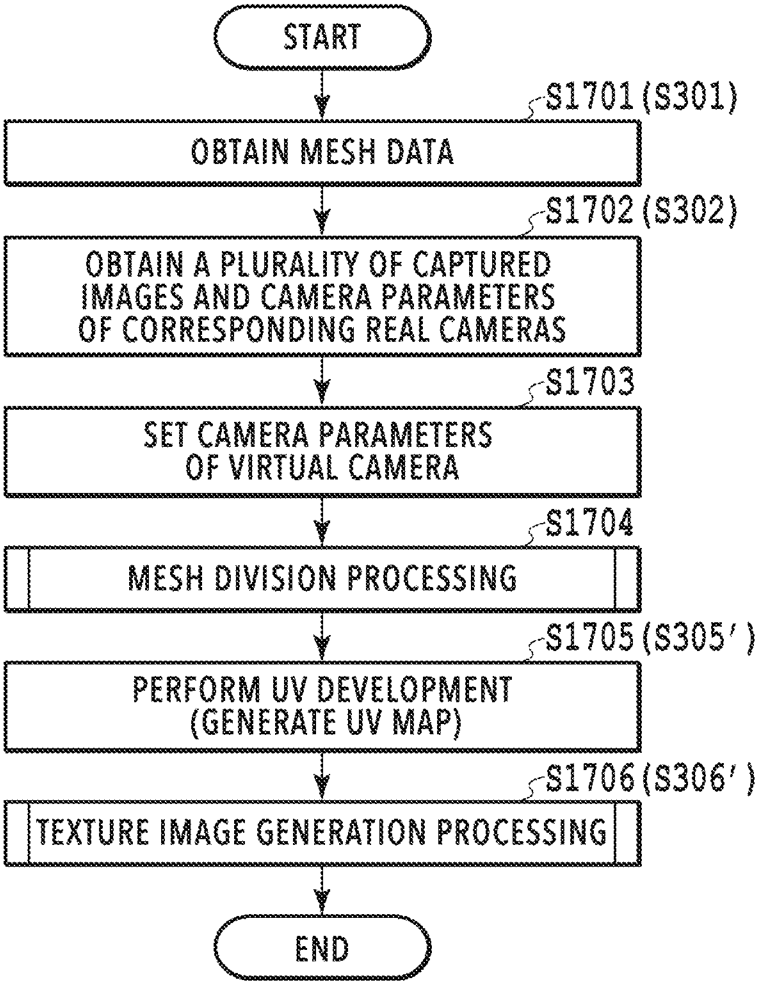
FIG. 17 is a flowchart showing a rough operation flow of an image processing apparatus according to a third embodiment.
Figure 19:
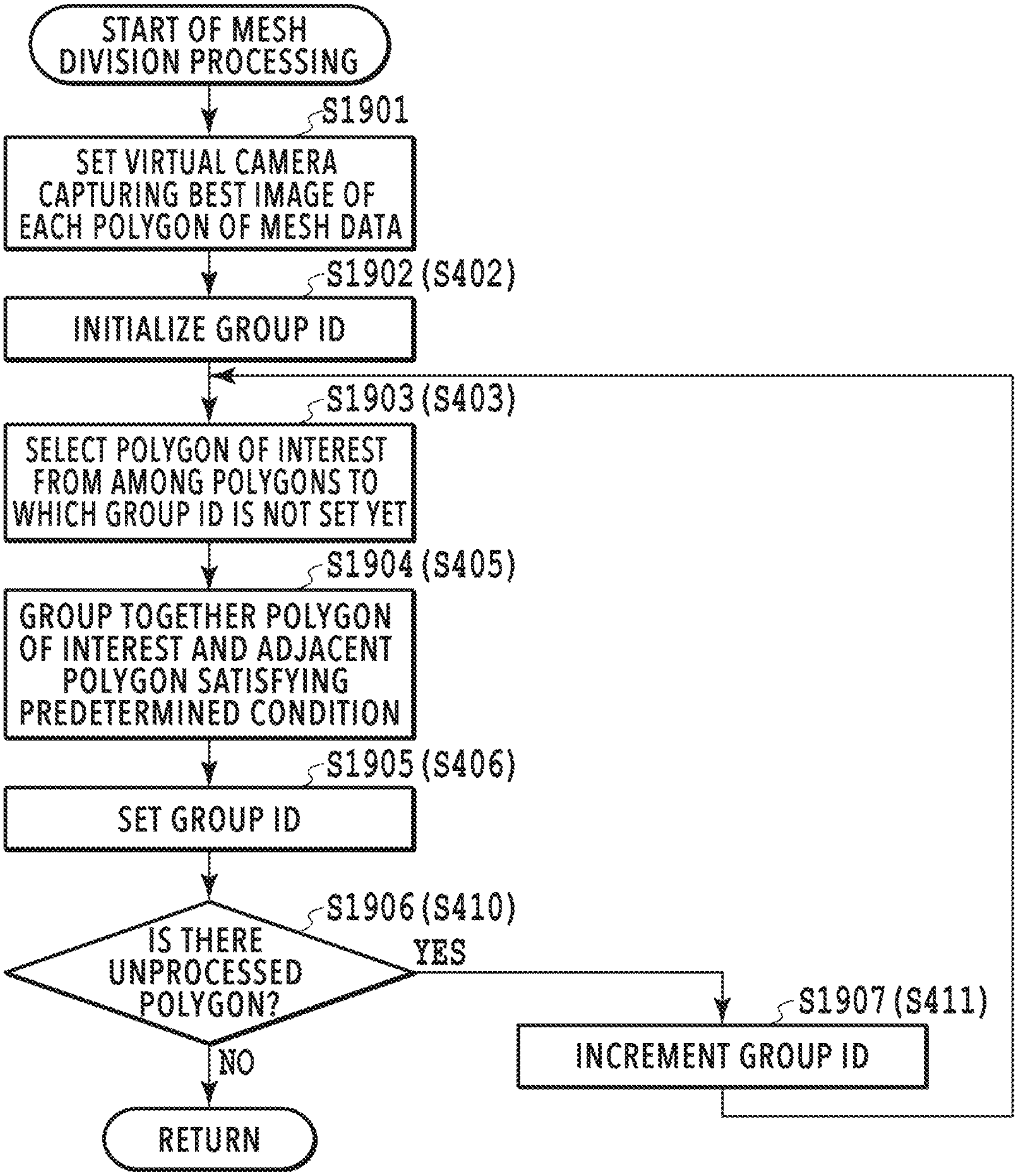
FIG. 19 is a flowchart showing details of mesh division processing according to the third embodiment.

The operation of the image processing apparatus 100 according to the present embodiment is explained with reference to the flowcharts shown FIG. 17 and FIG. 19. FIG. 17 is the flowchart of a main routine showing a rough operation flow of the image processing apparatus 100 and FIG. 19 is the flowchart of a sub routine corresponding to specific processing within the main routine. In the following, along each flowchart, the operation flow of the image processing apparatus 100 of the present embodiment is explained. In the following explanation, a symbol "S" means a step.

In the flowchart in FIG. 17, S1701 and S1702 correspond to S301 and S302 in the flowchart in FIG. 3 of the first embodiment and there is no difference particularly, and therefore, explanation is omitted.

Figure 18:
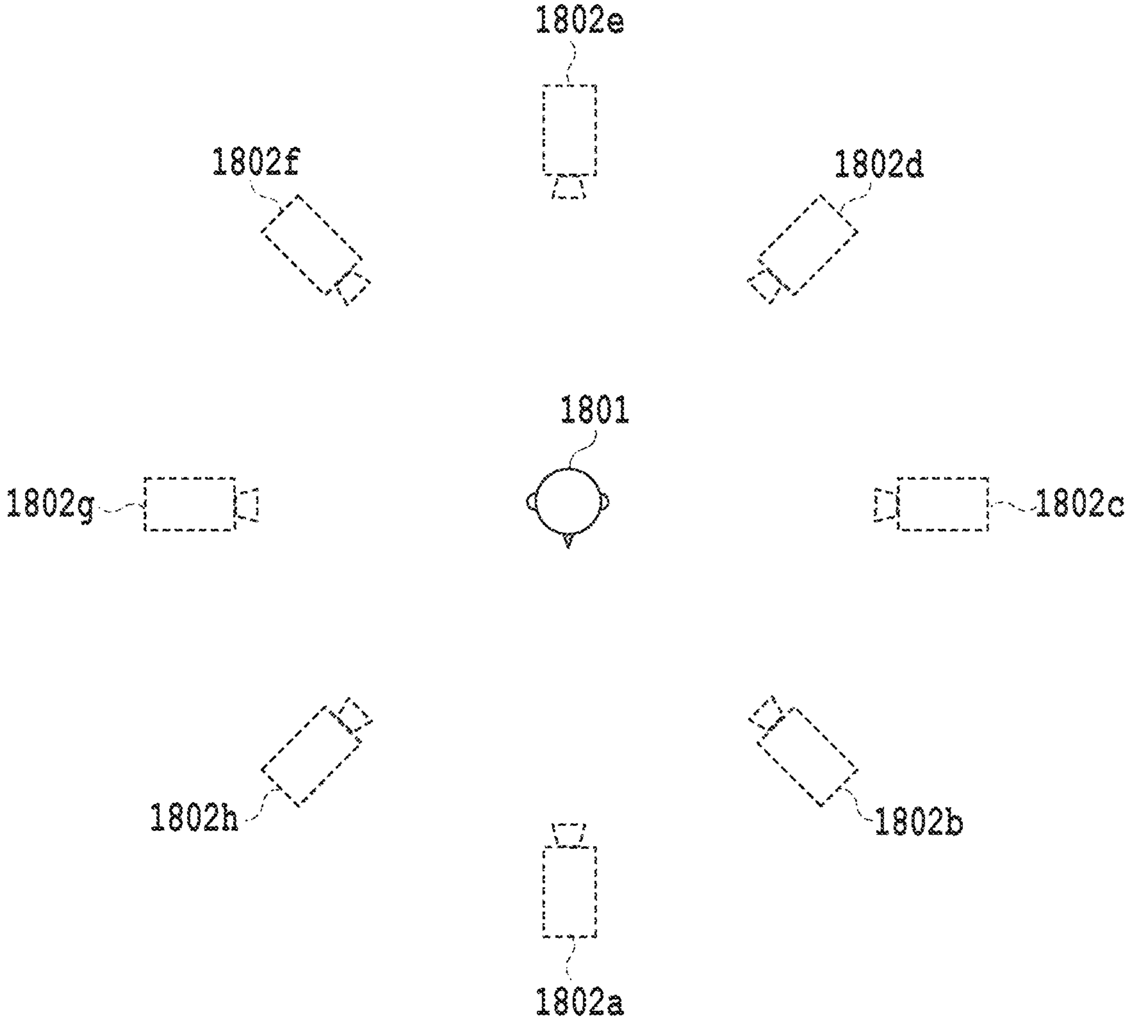
FIG. 18 is a diagram showing an arrangement example of virtual cameras.

At S1703 that follows S1702, the camera parameter setting unit 203 sets camera parameters of each virtual camera so that the plurality of virtual cameras is arranged at predetermined positions within the image capturing space respectively. Here, as one example, explanation is given by taking a case as an example where the virtual cameras are arranged at uniform intervals with the position of the mesh data obtained at S1701 as a reference. FIG. 18 is a diagram in a case where the state is viewed from above, where eight virtual cameras 1802*a* to 1802*h* are arranged at the front and rear portions, the left and right portions, the 45 degrees diagonally forward left and right portions, and the 45 degrees diagonally backward left and right portions of a mesh 1801 representing the three-dimensional shape of a person so as to surround the mesh 1801 from each direction.

At S1704, the mesh division unit 202 performs mesh division processing for the mesh data obtained at S1701 based on the camera parameters of the plurality of virtual cameras, which are set at S1702.

Details of Mesh Division Processing

Here, with reference to the flowchart in FIG. 19, the mesh division processing according to the present embodiment is explained in detail.

At S1901, the virtual camera having captured each polygon of the mesh data in the best state is set from among the plurality of virtual cameras set S1703 described above. Subsequent S1902 to S1907 correspond to S402, S403, S405, S406, S410, and S411, respectively, in the flowchart in FIG. 4 of the first embodiment. That is, first, at S1902, the group ID is initialized (S402) and following this, at S1903, one polygon not belonging to any group yet is selected as a polygon of interest from among each polygon configuring the mesh data (S403).

Then, at S1904, the adjacent polygon satisfying a predetermined condition with the selected polygon of interest is included in the same group as that of the polygon of interest (S405). In this grouping, first, the virtual camera set to the polygon of interest at S1901 is identified. Next, among other polygons with which the same virtual camera as the identified virtual camera is associated, all the polygons adjacent to the polygon of interest are identified. Then, a group including all the identified adjacent polygons and the polygon of interest is created.

At S1905, to the polygon of interest and the adjacent polygons belonging to the group created at S1904, a group ID identifying the group is set (S406). Then, at S1906, whether all the polygons configuring the mesh data are processed is determined (S410). In a case where there is an unprocessed polygon, the number of the group ID is incremented (S411) at S1907, and the processing returns to S1903 and the same processing is repeated.

The above is the contents of the mesh division processing (S1704) according to the present embodiment. Due to this, it is made possible to perform UV development by the virtual camera not depending on the shape of the mesh data or the arrangement of the real camera, and therefore, it is possible to increase the speed of the fragment generation processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to obtain a texture image of high image quality.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2023-102776, filed Jun. 22, 2023, and No. 2023-161507, filed Sep. 25, 2023, which are hereby incorporated by reference wherein in their entirety.

What is claimed is:

1. An image processing apparatus comprising:
one or more memories storing instructions; and
one or more processors executing the instructions to perform:
obtaining three-dimensional shape data of an object captured in a plurality of captured images whose viewpoints are different;
dividing elements configuring the three-dimensional shape data into a plurality of groups based on a positional relationship between a plurality of virtual viewpoints set in advance and the element configuring the three-dimensional shape data;
associating each of the plurality of groups with viewpoint information representing a specific viewpoint by taking the virtual viewpoint used for the division as the specific viewpoint;
generating a two-dimensional map based on the plurality of groups and the viewpoint information representing the specific viewpoint, which is associated with each group; and
generating a texture image representing a color of the object based on the two-dimensional map, wherein
the specific viewpoint includes a virtual viewpoint different from the viewpoint of each of the plurality of captured images.

2. The image processing apparatus according to claim 1, wherein
the division is performed based on an angle formed by a direction vector of the virtual viewpoint and a normal vector of the element configuring the three-dimensional shape data.

3. The image processing apparatus according to claim 1, wherein
the division is performed based on an area of a shape obtained in a case where the element configuring the three-dimensional shape data is projected based on the virtual viewpoint.

4. The image processing apparatus according to claim 1, wherein
the two-dimensional map is a two-dimensional map corresponding to the three-dimensional shape data, in which two-dimensional pieces obtained by performing UV development for each group are arranged and
the texture image is generated by calculating the pixel value of each pixel included in each two-dimensional piece on the two-dimensional map by using the plurality of captured images.

5. The image processing apparatus according to claim 4, wherein
the texture image is generated by calculating the pixel value of each pixel whose pixel center is included within the two-dimensional piece by using a captured image in which a group corresponding to the two-dimensional piece is captured among the plurality of captured images.

6. The image processing apparatus according to claim 1, wherein
the element configuring the three-dimensional shape data is a polygon and
the three-dimensional shape data is mesh data representing a surface shape of the object by a set of the polygons.

7. The image processing apparatus according to claim 1, wherein
the viewpoint information at least includes information identifying the position and orientation of a corresponding viewpoint.

8. An image processing method comprising the steps of:
obtaining three-dimensional shape data of an object captured in a plurality of captured images whose viewpoints are different;
dividing elements configuring the three-dimensional shape data into a plurality of groups based on a positional relationship between a plurality of virtual viewpoints set in advance and the element configuring the three-dimensional shape data;
associating each of the plurality of groups with viewpoint information representing a specific viewpoint by taking the virtual viewpoint used for the division as the specific viewpoint;
generating a two-dimensional map based on the plurality of groups and the viewpoint information representing the specific viewpoint, which is associated with each group; and
generating a texture image representing a color of the object based on the two-dimensional map, wherein
the specific viewpoint includes a virtual viewpoint different from the viewpoint of each of the plurality of captured images.

9. A non-transitory computer readable storage medium storing a program for causing a computer to perform an image processing method comprising the steps of:
obtaining three-dimensional shape data of an object captured in a plurality of captured images whose viewpoints are different;
dividing elements configuring the three-dimensional shape data into a plurality of groups based on a positional relationship between a plurality of virtual viewpoints set in advance and the element configuring the three-dimensional shape data;

associating each of the plurality of groups with viewpoint information representing a specific viewpoint by taking the virtual viewpoint used for the division as the specific viewpoint;

generating a two-dimensional map based on the plurality of groups and the viewpoint information representing the specific viewpoint, which is associated with each group; and generating a texture image representing a color of the object based on the two-dimensional map, wherein the specific viewpoint includes a virtual viewpoint different from the viewpoint of each of the plurality of captured images.

* * * * *